(12) United States Patent
Pisoni et al.

(10) Patent No.: US 8,045,703 B2
(45) Date of Patent: Oct. 25, 2011

(54) APPARATUS AND METHOD FOR ECHO-CANCELLATION

(75) Inventors: Fabio Pisoni, Busto Garolfo (IT); Roland Hug, Piétrain (BE); Marco Bonaventura, Venice (IT)

(73) Assignee: STMicroelectronics NV, Amsterdam (NL)

( * ) Notice: Subject to any disclaimer, the term of this patent is extended or adjusted under 35 U.S.C. 154(b) by 1442 days.

(21) Appl. No.: 10/514,689

(22) PCT Filed: May 19, 2003

(86) PCT No.: PCT/BE03/00088
§ 371 (c)(1),
(2), (4) Date: Nov. 17, 2004

(87) PCT Pub. No.: WO03/098833
PCT Pub. Date: Nov. 27, 2003

(65) Prior Publication Data
US 2005/0180559 A1     Aug. 18, 2005

(30) Foreign Application Priority Data
May 17, 2002   (EP) ...................................... 02291217

(51) Int. Cl.
*H04M 9/08* (2006.01)
(52) U.S. Cl. ................................ 379/406.12; 379/406.13
(58) Field of Classification Search ................ 379/3, 406.01–406.16, 93.21, 379/158, 202, 202.01, 416; 381/13, 71, 71.1, 381/71.14, 73.1, 94.1, 371; 375/260, 232, 375/350
See application file for complete search history.

(56) References Cited

U.S. PATENT DOCUMENTS

| | | | | | |
|---|---|---|---|---|---|
| 4,903,247 | A | * | 2/1990 | Van Gerwen et al. | 367/135 |
| 5,217,596 | A | * | 6/1993 | Indig et al. | 204/435 |
| 5,281,474 | A | * | 1/1994 | Matsuzaki et al. | 428/349 |
| 5,285,474 | A | * | 2/1994 | Chow et al. | 375/231 |
| 5,317,596 | A | * | 5/1994 | Ho et al. | 375/232 |

(Continued)

FOREIGN PATENT DOCUMENTS

DE      42 33 222 A1     4/1994
(Continued)

OTHER PUBLICATIONS

International Search Report from corresponding International Application No. PCT/BE03/00088, filed May 19, 2003.

(Continued)

*Primary Examiner* — MD S Elahee
*Assistant Examiner* — Akelaw Teshale
(74) *Attorney, Agent, or Firm* — Lisa K. Jorgenson; James H. Morris; Wolf, Greenfield & Sacks, P.C.

(57) ABSTRACT

There is disclosed a multi-carrier transceiver system for use in echo cancellation. The transceiver system is arranged to generate from input data a multicarrier transmit signal comprising a plurality of multi-carrier data blocks. The transceiver system also has a multi-carrier signal receiver responsive to an input multi-carrier receive signal received from a remote signal transmitter. An echo canceller is arranged to generate from a pair of multi-carrier data blocks (u) a set of frequency-domain echo parameters for use in generating an echo signal, to generate the echo signal using the frequency-domain echo parameters, and to input the echo signal to the multi-carrier signal receiver for use in generating an echo-cancelled receive signal from the input receive signal and the echo signal.

47 Claims, 8 Drawing Sheets

U.S. PATENT DOCUMENTS

| | | | |
|---|---|---|---|
| 6,023,719 | A | 2/2000 | Barak et al. |
| 6,473,409 | B1 * | 10/2002 | Malvar ........................... 370/286 |
| 6,519,291 | B1 * | 2/2003 | Dagdeviren et al. .......... 375/260 |
| 6,781,965 | B1 * | 8/2004 | Milosevic et al. ............ 370/286 |
| 2001/0021219 | A1 | 9/2001 | Sasaki et al. |
| 2002/0126834 | A1 * | 9/2002 | Seibert ..................... 379/406.01 |
| 2003/0112887 | A1 * | 6/2003 | Sang et al. .................... 375/285 |

FOREIGN PATENT DOCUMENTS

| | | |
|---|---|---|
| EP | 0 991 202 A1 | 4/2000 |
| WO | WO 01/63870 A1 | 8/2001 |
| WO | WO 01/93448 A2 | 12/2001 |
| WO | WO 01/93448 A3 | 12/2001 |

OTHER PUBLICATIONS

International Search Report from related International Application No. PCT/BE03/00087, filed May 19, 2003.

Van Acker, K et al., *Frequency Domain Equalization with Tone Grouping in DMT/ADSL-Receivers,Signals*, Systems, and Computers, 1999, Conference Record of the Thirty-Third Asilomar Conference n Oct. 24-27, 1999, Piscataway, NJ. pp. 1067-1070, XP010373800.

Van Acker, K et al., *Per Tone Equalization for DMT-Based Systems*, IEEE Transactions on Communications, vol. 49, No. 1, Jan. 2001, pp. 109-119, XP001038829.

* cited by examiner

APPARATUS AND METHOD FOR ECHO-CANCELLATION

BACKGROUND OF THE INVENTION

1. Field of the Invention

The present invention relates to methods and apparatus for echo cancellation in communications systems employing multi-carrier data modulation.

2. Discussion of the Related Art

Modern telecommunications systems typically employ duplex data transmission in which data is simultaneously transmitted in opposite directions between transceivers of the telecommunications system using data channels having overlapping frequency bands. Any imperfections in the transceivers means that, in a given transceiver, data signals transmitted by the transceiver may be permitted to leak into, and interfere with, signals received by the transceiver thereby degrading the quality of those received signals.

For example, in a common telephone handset a transmit signal representing voice data from a microphone is typically input to a hybrid transformer for subsequent transmission to a remote telephone handset. The transformer will typically allow most of the transmit signal to be transmitted to the remote telephone via a duplex transmission line. However, imperfections in the hybrid transformer will often cause some of the transmit signal to leak through the transformer, into the receiver of the handset and subsequently into the earpiece of the handset thereby interfering with the receive signal. As a result, while speaking into the handset, a person may well hear an "echo" of their own voice in the handset earpiece.

This is just one manifestation of signal "echo" in data transceivers, and in telephones it is an irritation at the very least. However, in other data transmission systems, such as modems, echo signals may present a major obstacle to efficient duplex data transmission causing serious corruption of received data.

Echo cancellation techniques have been developed in an attempt to mitigate the problems caused by echo signals. Typically, echo cancellation involves emulating an echo signal and subsequently subtracting that emulated signal from received signals in which an echo signal (which the emulated echo signal is intended to emulate) may exist. Thus, if echo emulation is exact, subtraction of the emulated echo from the received signal will result in a fully echo-free or echo-cancelled received signal.

The transceiver of a duplex telecommunications system may be regarded as providing an "echo path" from the transmitter part of the transceiver to the receiver part via e.g. the hybrid transformer thereof. By considering the "echo path" to define a filter with a frequency response or transfer function relating its input (i.e. the leaked transmit signal) to its output (i.e. the echo signal) one can attempt to emulate the echo signal by building a filter which emulates the frequency response or transfer function of the echo path. By passing a portion of a given transmit signal through the emulating filter an echo emulation may be produced substantially contemporaneously with the creation of the echo being emulated such that both derive from the same transmit signal.

Echo cancellers typically employ this technique, and their efficacy is sensitively dependent upon their ability to efficiently and accurately generate filter parameters ("echo parameters") for the echo-emulating filter. The generating of echo parameters is usually performed solely in the time-domain by emulating e.g. the echo path impulse response, with echo signal emulation subsequently employing Finite Impulse Response (FIR) filters to apply those echo parameters.

However, echo cancellation in purely the time-domain is computationally complex and relatively inefficient with echo parameter calculations requiring computationally expensive convolution calculations. Consequently, to avoid some of the deficiencies inherent in full time-domain echo emulation, techniques have been developed in which some echo parameter calculation is performed in the frequency domain with the consequence that computational complexity is reduced (note that a convolution in the time-domain is equivalent to a relatively simple multiplication in the frequency-domain). However, these techniques still require at least some echo parameter generation in the time-domain. In frequency-domain echo cancellation, one may obtain echo parameters merely by sampling the spectrum of the echo path rather than having to sample the response of the echo path which is relatively more computationally intensive.

SUMMARY OF THE PRESENT INVENTION

The present invention aims to provide an echo cancellation method and apparatus in which generation of echo parameters is performed in the frequency domain so as to avoid the computational complexity inherent in time-domain echo parameter generation. Once generated, the echo parameters may be applied to echo signal emulation in either the frequency-domain or in the time-domain.

Multi-carrier modulation is a well known means of transmitting digital data by splitting that data into fixed-length data "blocks" or "symbols" each comprised of the same number of sub-blocks. Analog transmission of these blocks is achieved using a set of carrier signals being equal in number to the number of sub-blocks per block, and having frequencies being equally spaced across the transmission band of the transceiver. The present invention also aims to provide such echo emulation for the purposes of echo cancellation in multi-carrier transceivers.

The present invention provides a method and apparatus for generating a set of frequency-domain echo parameters from a pair of multi-carrier data blocks selected from multi-carrier transmit signals, and from those frequency-domain echo parameters generating an echo component for emulating an echo signal for use in the echo cancellation of multi-carrier receive signals.

In a first of its aspects the present invention may provide a method of cancelling echo in a multi-carrier transceiver system having a multi-carrier transmitter arranged to transmit multi-carrier transmit signals comprising a plurality of multi-carrier data blocks, and a multi-carrier receiver arranged to receive multi-carrier signals. The method of echo cancelling the multi-carrier signal having a plurality of multi-carrier data blocks may comprise:

generating from a pair of said multi-carrier data blocks a set of frequency-domain echo parameters, generating an echo signal using said frequency-domain echo parameters, and generating an echo-cancelled received signal from said received multi-carrier signal and said echo signal.

The method may also include the steps of:
(a) generating from a pair of multi-carrier data blocks selected from multi-carrier transmit signals a set of frequency-domain echo parameters for use in generating an echo component;
(b) generating an echo component using the frequency-domain echo parameters;

(c) subtracting the echo component from multi-carrier receive signals to generate an echo-cancelled receive signal.

Thus, by generating echo parameters in the frequency domain, the complexities and inefficiencies of time-domain echo parameter generation may be obviated.

Preferably the pair of multi-carrier data blocks are time-domain multi-carrier data blocks each including a first predetermined number of time-domain data samples, and the step (a) includes:

selecting from both of said pair of time-domain multi-carrier data blocks a second predetermined number of time-domain data samples, the second predetermined number being substantially twice the first predetermined number;

generating from the second predetermined number of time-domain data samples a frequency-domain transmit block comprising a third predetermined number of frequency-domain data samples;

generating the frequency-domain echo parameters using the frequency-domain transmit block.

The first predetermined number may comprise all or only some of the data samples within a multi-carrier data block. For example, where each of the multi-carrier data blocks incorporates a cyclic prefix comprising a given number of additional time-domain data samples, then preferably the second predetermined number is substantially twice the number data samples within a multi-carrier data block which are other than cyclic prefix samples. For example, if each of the pair of selected multi-carrier data blocks includes N time-domain data samples, and L additional cyclic prefix samples (typically being copies of some of the N time-domain samples), then the second predetermined number is preferably 2×N.

It is preferable that steps (a) to (c) above comprise the steps of:

generating the frequency-domain echo parameters;

generating an echo component in the time domain or in the frequency domain using the echo parameters;

subtracting the echo component from the multi-carrier receive signal in the time domain or in the frequency domain to generate an echo-cancelled receive signal;

generating from the echo-cancelled receive signal a frequency-domain echo-cancelled receive block comprising a fourth predetermined number of frequency-domain data samples;

generating from the frequency-domain transmit block and the frequency-domain echo-cancelled receive block a set of frequency-domain echo update parameters for use in updating the frequency-domain echo parameters;

applying the frequency-domain echo update parameters to the frequency-domain echo parameters if a predetermined condition is met by the frequency-domain echo update parameters.

The frequency-domain transmit block preferably comprises data samples equivalent to eigenvalues of a circulant matrix formed from the second predetermined number of time-domain data samples selected from the pair of multi-carrier data blocks. Preferably the frequency-domain echo parameters represent the frequency response of an echo path through the transceiver from the multi-carrier transmitter to the multi-carrier receiver.

It is also preferable that step (a) above includes the step of:

generating from the frequency-domain transmit block a first frequency-domain transmit sub-block and a second frequency-domain transmit sub-block each comprising frequency-domain data samples being selected from the frequency-domain transmit block. Preferably such selection is such that the first and second frequency-domain transmit sub-blocks do not share a common frequency-domain data sample.

For example, the frequency-domain data samples of the first transmit sub-block may be the odd-numbered data samples (e.g. $1^{st}$, $3^{rd}$, $5^{th}$, ...) from the frequency-domain transmit block, while the frequency-domain data samples of the second transmit sub-block may be the remaining even-numbered data samples (e.g. $2^{nd}$, $4^{th}$, $6^{th}$, ...) from the frequency-domain transmit block (or vice-versa).

The frequency-domain update parameters may be generated by multiplying the frequency-domain echo-cancelled receive block with the complex conjugate of the sum of the first frequency-domain transmit sub-block and the second frequency-domain transmit sub-block, and multiplying the result with a scalar weight term determined in accordance with the predetermined condition. Alternatively, the aforementioned sum may omit the second frequency-domain transmit block and comprise only the first transmit sub-block.

The predetermined condition may be determined in accordance with known Least Mean Square (LMS) algorithm techniques as would be readily apparent to the skilled person. An example of a suitable such technique is discussed in "Adaptive Filter Theory" by Simon Haykin (ISBN: 0-13-433760-X).

The third predetermined number of frequency-domain data samples of the frequency-domain transmit block are preferably generated from the second predetermined number of time-domain data samples and are chosen such that the third predetermined number is substantially equal to the second predetermined number to the nearest integer, and the fourth predetermined number of frequency-domain samples of the frequency-domain echo-cancelled receive block are preferably chosen such that the fourth predetermined number is substantially equal to the first predetermined number to the nearest integer. Alternatively, in other embodiments, the third and fourth predetermined numbers may equal to the first predetermined number and half the first predetermined number respectively to the nearest integer (e.g. decimated by two).

The step (b) above may comprise the steps of:

generating time-domain echo parameters from the frequency-domain echo parameters;

applying the time-domain echo parameters to multi-carrier transmit signals so as to generate the echo component in the time domain.

The time-domain echo parameters so generated preferably form a Finite Impulse Response (FIR) sequence representing the response of an echo path through the transceiver from the multi-carrier transmitter to the multi-carrier receiver, and the FIR sequence is preferably applied to the multi-carrier transmit signals via an FIR filter through which the multi-carrier transmit signals are caused to pass.

The time-domain echo parameters may comprise a fifth predetermined number of time-domain data samples, the fifth predetermined number being substantially equal to the first predetermined number.

Alternatively, an echo component may be generated by:

multiplying the frequency-domain echo parameters with the first frequency domain transmit sub-block to produce a first echo sub-component; and, generating a second echo sub-component by pre-multiplying the frequency-domain echo parameters with the second frequency-domain transmit sub-block transformed according to a first predetermined transform operation, the echo component being the sum of the first echo sub-component and the second echo sub-component.

In this alternative method, the frequency-domain update parameters are generated by:

generating a first sum being the sum of the first frequency-domain transmit sub-block to the second frequency-domain transmit sub-block transformed according to the first predetermined transform operation;

generating a second sum being the complex conjugate of the first sum;

pre-multiplying the frequency-domain echo-cancelled receive block with the second sum and with a scalar weight term determined in accordance with the predetermined condition.

Preferably, the first predetermined transform operation comprises:

as a first operation step, generating a first transform parameter block arranged to transform into the time domain frequency domain data blocks pre-multiplied thereby;

as a second operation step, pre-multiplying the result of the first operation step with a first operator parameter block;

as a third operation step, pre-multiplying the result of the second operation step with a second transform parameter block arranged to transform into the frequency domain time domain data blocks pre-multiplied thereby;

as a fourth operation step, pre-multiplying the result of the third operation step with the second frequency-domain transmit sub-block;

as a fifth operation step, pre-multiplying the result of the fourth operation step with the first transform parameter block;

as a sixth operation step, pre-multiplying the result of the fifth operation step with second operator parameter block representing an operation being the inverse of the operation represented by the first operator parameter block;

as a seventh operation step, pre-multiplying the result of the sixth operation step with the second transform parameter block to form the second frequency-domain transmit sub-block transformed according to the predetermined operation.

Preferably, the steps of generating of the second echo sub-component and the subsequent generating of the frequency-domain echo update parameters both employ the same said first transform parameter block, said second transform parameter block, said first operator parameter block, and said second operator parameter block.

The first frequency-domain transmit sub-block is preferably generated from data samples equivalent to eigenvalues of a circulant matrix formed from the second predetermined number of time-domain data samples selected from the pair of multi-carrier data blocks; and, the second frequency-domain transmit sub-block is preferably generated from data samples equivalent to eigenvalues of a skew-circulant matrix formed from the second predetermined number of time-domain data samples selected from the pair of multi-carrier data blocks.

The first and second operator parameter blocks may each represent an operator arranged to render circulant the skew-circulant matrix by operation thereupon.

Preferably, the step of generating the second echo sub-component comprises:

generating the second echo sub-component by infrequently pre-multiplying the frequency-domain echo parameters with the second frequency-domain transmit sub-block transformed according to the predetermined transform operation in which the first to the third operation steps are performed in respect of a first pair of multi-carrier data blocks selected from multi-carrier transmit signals, and the result of the third operation step on the first pair of multi-carrier data blocks is stored as a set of intermediate frequency-domain echo parameters;

subsequently performing, in respect of the first pair of multi-carrier data blocks and in respect of at least one subsequent pair of multi-carrier data blocks selected from multi-carrier transmit signals, the fourth to the seventh operation steps using the same said set of intermediate frequency-domain echo parameters.

Preferably, each first transform parameter block and each said second transform parameter block represents an N-point transform where N is an integer substantially equal to the first predetermined number. Alternatively each first transform parameter block and each said second transform parameter block may represent an (N/2)-point transform where N is an integer substantially equal to the first predetermined number.

Preferably, the first transform parameter block of the first operation step represents an N-point transform;

the second transform parameter block of the third operation step represents an N-point transform;

the first transform parameter block of the fifth operation step represents an N-point transform; and, the second transform parameter block of the seventh operation step represents an N-point transform where N is an integer substantially equal to the first predetermined number. Alternatively, said third and said first transform operation steps may each represent an (N/2)-point transform.

Preferably, the first transform parameter block represents an Inverse Fourier Transform and the second transform parameter block represents a Fourier Transform.

In other arrangements, the generation of an echo component may include pre-multiplying the frequency-domain echo parameters with:

the first frequency-domain transform sub-block transformed according to a first predetermined transform operation to produce a first echo sub-component; and, the first frequency-domain transform sub-block transformed according to a second predetermined transform operation to produce a second echo sub-component; and, the second frequency-domain transform sub-block transformed according to a third predetermined transform operation to produce a third echo sub-component; and, the second frequency-domain transform sub-block transformed according to a fourth predetermined transform operation to produce a fourth echo sub-component, the echo component being the sum of the first, the second, the third and the fourth echo sub-components.

In this arrangement the frequency-domain update parameters may be generated by generating a first sum being the sum of:

the first frequency-domain transform sub-block transformed according to the first predetermined transform operation and, the first frequency-domain transform sub-block transformed according to the second predetermined transform operation and, the second frequency-domain transform sub-block transformed according to the third predetermined transform operation and, the second frequency-domain transform sub-block transformed according to the fourth predetermined transform operation;

generating a second sum being the complex conjugate of the first sum; and, pre-multiplying the frequency-domain echo-cancelled receive block with the second sum and with a scalar weight term determined according to the predetermined condition.

Preferably, each of the first, the second, the third and the fourth predetermined transform operations comprises:

as a first operation step, generating a first transform parameter block arranged to transform into the time domain frequency domain data blocks pre-multiplied thereby;

as a second operation step, pre-multiplying the result of the second operation step with a second transform parameter block arranged to transform into the frequency domain time domain data blocks pre-multiplied thereby;

as a third operation step, pre-multiplying the result of the second operation step with one of the first and the second frequency-domain transmit sub-block;

as a fourth operation step, pre-multiplying the result of the third operation step with a third transform parameter block arranged to transform into the time domain frequency domain data blocks pre-multiplied thereby.

Preferably, in the first predetermined transform operation:

the first transform parameter block represents an Inverse Fourier Transform;

the second transform parameter block represents a Discrete Sine Transform;

at the third operation step the result of the second operation step is pre-multiplied with the second frequency-domain transmit sub-block; and, the third transform parameter block represents a Discrete Cosine Transform.

Preferably, in the second predetermined transform operation:

the first transform parameter block represents an Inverse Fourier Transform;

the second transform parameter block represents a Discrete Cosine Transform;

at the third operation step the result of the second operation step is pre-multiplied with the first frequency-domain transmit sub-block; and, the third transform parameter block represents a Discrete Cosine Transform.

Preferably, in the third predetermined transform operation:

the first transform parameter block represents an Inverse Fourier Transform;

the second transform parameter block represents a Discrete Sine Transform;

at the third operation step the result of the second operation step is pre-multiplied with the first frequency-domain transmit sub-block; and, the third transform parameter block represents a Discrete Sine Transform.

Preferably, in the fourth predetermined transform operation:

the first transform parameter block represents an Inverse Fourier Transform;

the second transform parameter block represents a Discrete Cosine Transform;

at the third operation step the result of the second operation step is pre-multiplied with the second frequency-domain transmit sub-block; and, the third transform parameter block represents a Discrete Sine Transform.

Preferably, in the generating of the second echo sub-component and the subsequent generating of the frequency-domain echo update parameters both employ the same said first transform parameter block and said second transform parameter block.

Preferably, the first frequency-domain transmit sub-block is generated from data samples equivalent to eigenvalues of a symmetric matrix formed from the second predetermined number of time-domain data samples selected from said pair of multi-carrier data blocks; and, the second frequency-domain transmit sub-block is generated from data samples equivalent to eigenvalues of an anti-symmetric matrix formed from said predetermined second number of time-domain data samples selected from the pair of multi-carrier data blocks.

The first transform parameter block and each said second transform parameter block may represent an N-point transform where N is an integer substantially equal to the first predetermined number.

The multi-carrier transmit signals and the multi-carrier receive signals may be Discrete Multi-tone (DMT) signals.

The present invention also provides a multi-carrier receiver comprising elements and circuits for carrying out the above methods and as defined in the attached claims. The receiver may be included in a transceiver. The transceiver may be, for example, an Asymmetric Digital Subscriber Line (ADSL) transceiver, e.g. it may be included in an ADSL modem.

In a second of its aspects the present invention may provide a multi-carrier transceiver system having:

a multi-carrier signal transmitter responsive to input data and arranged to generate therefrom a multi-carrier transmit signal comprising a plurality of multi-carrier data blocks for communication to a remote signal receiver via a signal transmission link;

a multi-carrier signal receiver responsive to an input multi-carrier receive signal received from a remote signal transmitter via the signal transmission link, and responsive to an echo signal and arranged to generate an echo-cancelled receive signal from the input receive signal and the echo signal;

an echo canceller means arranged to generate from a pair of the multi-carrier data blocks a set of frequency-domain echo parameters for use in generating the echo signal, to generate the echo signal using the frequency-domain echo parameters, and to input the echo signal to the multi-carrier signal receiver for use in generating the echo-cancelled receive signal.

Preferably the pair of multi-carrier data blocks are time-domain multi-carrier data blocks each including a first predetermined number of time-domain data samples, and the echo canceller means is arranged to generate the frequency-domain echo parameters from a second predetermined number of time-domain data samples selected from both of said pair of time-domain multi-carrier data blocks, the second predetermined number being substantially twice the first predetermined number.

The first predetermined number may comprise all or only some of the data samples within a multi-carrier data block. For example, where each of the multi-carrier data blocks incorporates a cyclic prefix comprising a given number of additional time-domain data samples, then preferably the second predetermined number is substantially twice the number data samples within a multi-carrier data block which are other than cyclic prefix samples.

The echo canceller means preferably comprises:

echo parameter generator means for generating the frequency-domain echo parameters;

echo component generator means responsive to input echo parameters and arranged to generate an echo component in the time domain or in the frequency domain using the input echo parameters;

subtracting means responsive to input echo components and to input multi-carrier receiver signals and arranged to subtract the input echo components from the input multi-carrier receive signal in the time domain or in the frequency domain to generate an echo-cancelled receive signal;

transmit block generating means for generating from the second predetermined number of time-domain data samples a frequency-domain transmit block comprising a third predetermined number of frequency-domain data samples;

receive block generating means for generating from echo-cancelled receive signals a frequency-domain echo-cancelled receive block comprising a fourth predetermined number of frequency-domain data samples;

updating means responsive to input frequency-domain transmit blocks and responsive to input frequency-domain echo-cancelled receive blocks and arranged to generate therefrom a set of frequency-domain echo update parameters for use in updating the frequency-domain echo parameters;

means for applying frequency-domain echo update parameters to the frequency-domain echo parameters if a predetermined condition is met by the frequency-domain echo update parameters.

Preferably the transmit block generating means is arranged to generate a frequency-domain transmit block comprising data samples equivalent to eigenvalues of a circulant matrix formed from the second predetermined number of time-domain data samples selected from the pair of multi-carrier data blocks.

The echo parameter generator may be arranged to generate frequency-domain echo parameters representing the frequency response of an echo path through the transceiver from the multi-carrier transmitter to the multi-carrier receiver.

The transmit block generating means is preferably arranged to generate from the frequency-domain transmit block a first frequency-domain transmit sub-block and a second frequency-domain transmit sub-block each comprising frequency-domain data samples being selected from the frequency-domain transmit block. Preferably the selection is such that the first and second frequency-domain transmit sub-blocks do not share a common frequency-domain data sample.

For example, the frequency-domain data samples of the first transmit sub-block may be the odd-numbered data samples from the frequency-domain transmit block, while the frequency-domain data samples of the second transmit sub-block may be the remaining even-numbered data samples from the frequency-domain transmit block (or vice-versa).

The updating means is preferably arranged to:

form a conjugate sub-block being the complex conjugate of the first frequency-domain transmit sub-block; and, pre-multiply the frequency-domain echo-cancelled receive block with the conjugate sub-block and with a scalar weight term determined in accordance with the predetermined condition.

The updating means, in alternative arrangements, may be responsive to input frequency-domain echo-cancelled receive blocks and to input frequency-domain transmit blocks transformed according to a pre-determined transform operation wherein the receive blocks in question pre-multiply the transmit blocks so transformed. For example, the transformed transmit block in question may be the second frequency-domain transmit sub-block which, once transformed and pre-multiplied by echo-cancelled receive block, is input to the updating means together with the first frequency-domain transmit sub-block (conjugated or otherwise). These two transmit sub-blocks may then be summed together and the resultant sum pre-multiplied by the aforementioned scalar weight term.

Preferably, the transmit block generating means is arranged to generate the third predetermined number of frequency-domain data samples of the frequency-domain transmit block from the second predetermined number of time-domain data samples chosen such that the third predetermined number is substantially equal to the second predetermined number to the nearest integer. The fourth predetermined number of frequency-domain samples of the frequency-domain echo-cancelled receive block are preferably chosen such that the fourth predetermined number is substantially equal to the first predetermined number to the nearest integer. In alternative embodiments, said third and fourth predetermined numbers may be half the first predetermined number to the nearest integer.

The echo component generator may be arranged to:

generate time-domain echo parameters from the frequency-domain echo parameters; and to, apply the time-domain echo parameters to multi-carrier transmit signals so as to generate the echo component in the time domain.

In this arrangement, the echo component generator is preferably arranged to generate time-domain echo parameters so as to form a Finite Impulse Response (FIR) sequence representing the response of an echo path through the transceiver from the multi-carrier transmitter to the multi-carrier receiver, and the echo component generator preferably includes an FIR filter arranged to receive the multi-carrier transmit signals and the FIR sequence and to apply the FIR sequence to the multi-carrier transmit signals.

The echo component generator may be arranged to generate the time-domain echo parameters so as to comprise a fifth predetermined number of time-domain data samples, the fifth predetermined number being substantially equal to the first predetermined number.

Alternatively, the echo component generator may include:

a first multiplying means for pre-multiplying the frequency-domain echo parameters with the first frequency domain transmit sub-block to produce a first echo sub-component; and, transforming means for transforming the second frequency-domain transmit sub-block according to a first predetermined transform operation and for pre-multiplying the frequency-domain echo parameters with the frequency-domain sub-block so transformed thereby to generate a second echo sub-component, the echo component being the sum of the first echo sub-component and the second echo sub-component.

The updating means may be arranged to:

generate a first sum being the sum of the first frequency-domain transmit sub-block and the second frequency-domain transmit sub-block transformed according to the first predetermined transform operation;

generate a second sum being the complex conjugate of the first sum; and to, pre-multiply the frequency-domain echo-cancelled receive block with the second sum and with a scalar weight term determined in accordance with the predetermined condition thereby to generate the frequency-domain update parameters. Alternatively, the first sum may omit the second frequency-domain transmit sub-block (transformed) and may comprise only the first frequency-domain transmit sub-block.

The transforming means may comprise:

a first operator means arranged to generate a first transform parameter block suitable to transform into the time domain frequency domain data blocks pre-multiplied thereby;

a second operator means responsive to an output from the first operator means and arranged to pre-multiply the output of the first operator means with a first operator parameter block;

a third operator means responsive to an output from the second operator means and arranged to pre-multiply the output of the second operator means with a second transform parameter block suitable to transform into the frequency domain time domain data blocks pre-multiplied thereby;

a fourth operator means responsive to an output from the third operator means and arranged to pre-multiply the output of the third operator means with the second frequency-domain transmit sub-block;

a fifth operator means responsive to an output from the fourth operator means and arranged to pre-multiply the output of the fourth operator means with the first transform parameter block;

a sixth operator means responsive to an output from the fifth operator means and arranged to pre-multiply the output of the fifth operator means with a second operator parameter block representing an operation being the inverse of the operation represented by the first operator parameter block;

a seventh operator means responsive to an output from the sixth operator means and arranged to pre-multiply the output of the sixth operator block with the second transform parameter block to form the second frequency-domain transmit sub-block transformed according to the first predetermined transform operation.

The transforming means and the updating means preferably both employ the same first transform parameter block, second transform parameter block, first operator parameter block, and second operator parameter block.

The transmit block generating means is preferably arranged to:

generate the first frequency-domain transmit sub-block from data samples equivalent to eigenvalues of a circulant matrix formed from the second predetermined number of time-domain data samples selected from the pair of multi-carrier data blocks; and to, generate the second frequency-domain transmit sub-block from data samples equivalent to eigenvalues of a skew-circulant matrix formed from the second predetermined number of time-domain data samples selected from the pair of multi-carrier data blocks.

Preferably, the first and second operator parameter blocks each represent an operator arranged to render circulant the skew-circulant matrix by operation thereupon.

The echo component generator may include intermediate storage means for storing the output of the third operator means as a set of intermediate frequency-domain echo parameters and the echo component generator may be arranged to:

generate the second echo sub-component in respect of a first pair of multi-carrier data blocks by infrequently pre-multiplying the frequency-domain echo parameters with the second frequency-domain transmit sub-block transformed according to the first predetermined transform operation; and, store in the intermediate storage means the output of the third operator means as a set of intermediate frequency-domain echo parameters; and, generate subsequent second echo sub-component(s) in respect of at least one subsequent pair of multi-carrier data blocks selected from subsequent multi-carrier transmit signals, using the set of intermediate frequency-domain echo parameters as input to the fourth operator means without employing the first, the second or the third operator means.

Preferably, each first transform parameter block and each said second transform parameter block represents an N-point transform where N is an integer substantially equal to the first predetermined number.

Alternatively, each first transform parameter block and each said second transform parameter block may represent an (N/2)-point transform where N is an integer substantially equal to the first predetermined number.

Preferably, the multi-carrier transceiver system is arranged such that:

the first transform parameter block of the first operator means represents an N-point transform;

the second transform parameter block of the third operator means represents an N-point transform;

the first transform parameter block of the fifth operator means represents an N-point transform; and, the second transform parameter block of the seventh operator means represents an N-point transform where N is an integer substantially equal to the first predetermined number. However, the first and second transform parameter blocks may be N-point transforms instead.

The first transform parameter block may represent an Inverse Fourier Transform and the second transform parameter block may represent a Fourier Transform.

In other arrangements of the multi-carrier transceiver system, the echo component generator may include:

a first transforming means for transforming the first frequency-domain transmit sub-block according to a first predetermined transform operation, and for pre-multiplying the frequency-domain echo parameters with the first frequency-domain transmit sub-block so transformed thereby to produce a first echo sub-component; and, a second transforming means for transforming the first frequency-domain transmit sub-block according to a second predetermined transform operation, and for pre-multiplying the frequency-domain echo parameters with the second frequency-domain transmit sub-block so transformed thereby to produce a second echo sub-component; and, a third transforming means for transforming the second frequency-domain transmit sub-block according to a third predetermined transform operation, and for pre-multiplying the frequency-domain echo parameters with the third frequency-domain transmit sub-block so transformed thereby to produce a third echo sub-component; and, a fourth transforming means for transforming the second frequency-domain transmit sub-block according to a fourth predetermined transform operation, and for pre-multiplying the frequency-domain echo parameters with the fourth frequency-domain transmit sub-block so transformed thereby to produce a fourth echo sub-component, the echo component being the sum of the first, the second, the third and the fourth echo sub-components.

The updating means is preferably arranged to generate a first sum being the sum of:

the first frequency-domain transmit sub-block transformed according to the first predetermined transform operation and, the first frequency-domain transmit sub-block transformed according to the second predetermined transform operation and, the second frequency-domain transmit sub-block transformed according to the third predetermined transform operation and, the second frequency-domain transmit sub-block transformed according to the fourth predetermined transform operation; and is further arranged to, generate a second sum being the complex conjugate of the first sum; and to, pre-multiply the frequency-domain echo-cancelled receive block with the second sum and with a scalar weight term determined according to the predetermined condition.

Preferably, each of said first, said second, said third and said fourth transforming means comprises:

a first operator means arranged to generate a first transform parameter block arranged to transform into the time domain frequency domain data blocks pre-multiplied thereby;

a second operator means responsive to an output from the second operator means and arranged to pre-multiply the output of the second operator means with a second transform parameter block arranged to transform into the frequency domain time domain data blocks pre-multiplied thereby;

a third operator means responsive to an output from the third operator means and arranged to pre-multiply the output of the second operator means with one of the first and the second frequency-domain transmit sub-block;

a fourth operator means responsive to an output from the third operator means and arranged to pre-multiply the output of the third operator means with a third transform parameter block arranged to transform into the time domain frequency domain data blocks pre-multiplied thereby.

The first predetermined transform operation may be such that:

the first transform parameter block represents an Inverse Fourier Transform;

the second transform parameter block represents a Discrete Sine Transform;

the third operator means is arranged to pre-multiply the output of the second operator means with the second frequency-domain transmit sub-block; and, the third transform parameter block represents a Discrete Cosine Transform.

Additionally it is preferable that in the second predetermined transform operation:

the first transform parameter block represents an Inverse Fourier Transform;

the second transform parameter block represents a Discrete Cosine Transform;

the third operator means is arranged to pre-multiply the output of the second operator means with the first frequency-domain transmit sub-block; and, the third transform parameter block represents a Discrete Cosine Transform.

Additionally, it is preferable that in the third predetermined transform operation:

the first transform parameter block represents an Inverse Fourier Transform;

the second transform parameter block represents a Discrete Sine Transform;

the third operator means is arranged to pre-multiply the output of the second operator means with the first frequency-domain transmit sub-block; and, the third transform parameter block represents a Discrete Sine Transform.

In addition, it is preferable that in the fourth predetermined transform operation:

the first transform parameter block represents an Inverse Fourier Transform;

the second transform parameter block represents a Discrete Cosine Transform;

the third operator means is arranged to pre-multiply the output of the second operator means with the second frequency-domain transmit sub-block; and, the third transform parameter block represents a Discrete Sine Transform.

The echo component generator and the updating means may both employ the same the first transform parameter block and the second transform parameter block.

Each first transform parameter block and each said second transform parameter block may represent an N-point transform where N is an integer substantially equal to the first predetermined number.

The multi-carrier transmit signals and the multi-carrier receive signals may be Discrete Multi-tone (DMT) signals, and the multi-carrier transceiver may be an Asymmetric Digital Subscriber Line (ADSL) transceiver.

There now follow several illustrative, but non-limiting examples of the present invention with reference to the drawings.

BRIEF DESCRIPTION OF THE DRAWINGS

In the drawings, and in the following description, like elements have been assigned like numerals for the sake of consistency.

DETAILED DESCRIPTION OF THE ILLUSTRATIVE EMBODIMENTS

Figure 1:
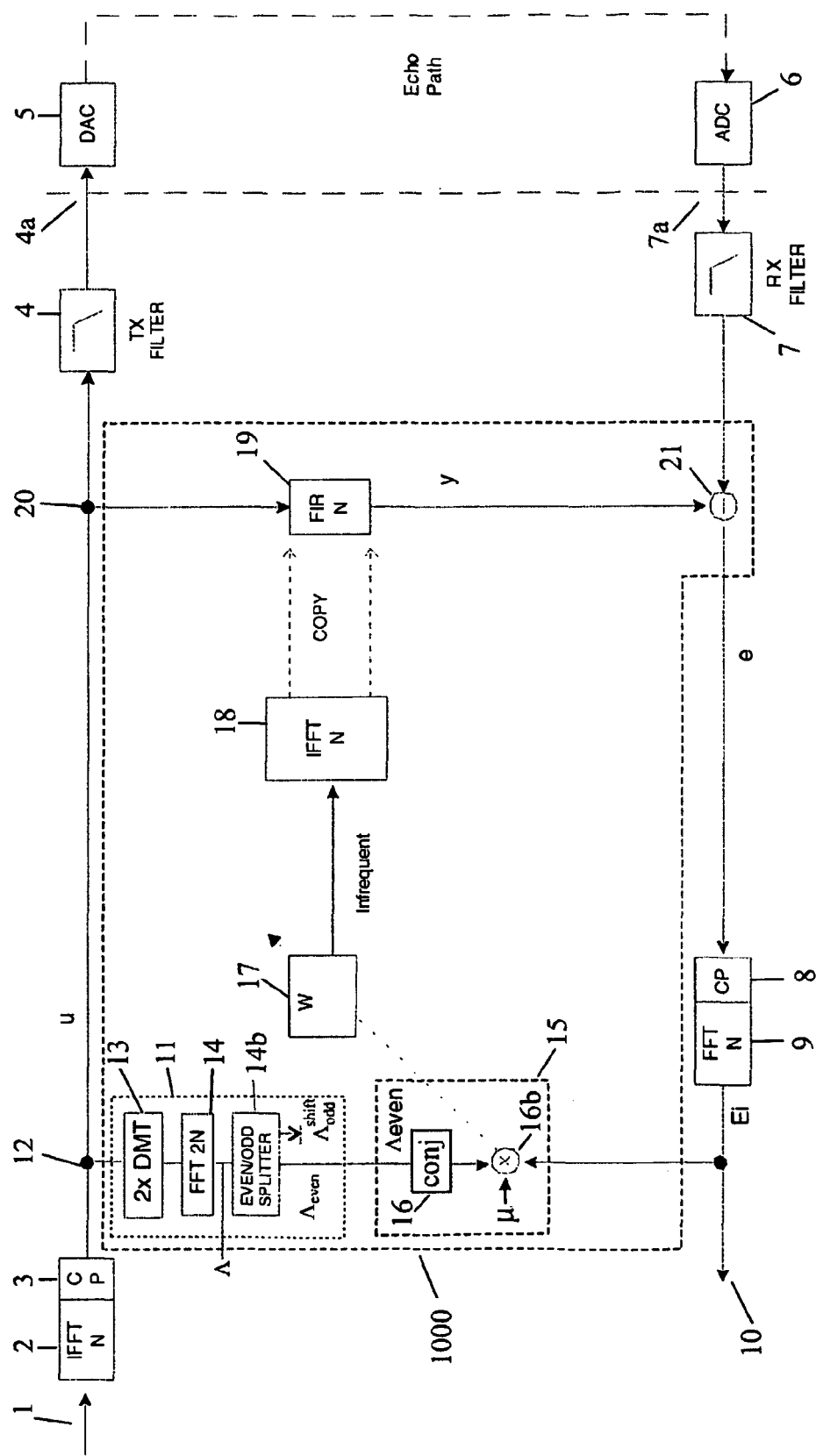
FIG. 1 illustrates a transceiver in which echo emulation is completed in the frequency domain, and echo cancellation is applied in the time-domain in accordance with an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

With reference to each of FIGS. 1 to 7, there is illustrated a discrete multi-tone (DMT) transceiver employing an echo canceller according to a respective embodiment of the present invention. The transceiver may be part of a modem, e.g. an ADSL modem. An echo canceller, a receiver including the echo canceller, a transceiver including the receiver and a modem including the transceiver in accordance with the present invention may each be constructed as a separate item, e.g. each as a Printed Circuit Board or as an Integrated circuit or ASIC.

The transceiver includes a transmitter portion having a data input 1 for receiving data to be transmitted, and a signal output 4*a* for outputting transmit signals to a digital-to-analog converter (DAC) 5 for subsequent transmission. The transceiver also includes a receiver portion having a receive signal input 7*a* for receiving signals transmitted from remote transceivers via an analog-to-digital converter (ADC) 6, and a receive data output 10 for outputting echo-cancelled received data. An echo path exists between the transmitter portion output 4a and the receiver portion input 7a and defines a path through which echo signals may pass. The echo path includes at least the hybrid transformer (not shown) of the transceiver and may include other elements of the transceiver located outside the transmitter portion and the receiver portion of the transceiver.

In the transmitter portion of the transceiver, an inverse fast Fourier transform unit (IFFT) 2 receives input data in the form of frequency-domain DMT data blocks comprised of N complex-valued data elements. The IFFT unit 2 modulates each of the N data elements with N carrier signals at evenly spaced frequency intervals thereby converting the N frequency-domain data elements into a block (or "symbol") of N real-valued time-domain samples.

A cyclic prefix block (CP) 3 copies the last L samples of the N time-domain sample block to form a cyclic prefix therewith, and prepends the cyclic prefix to the beginning of the block. This is done in order to eliminate inter-block interference at the remote transceiver to which the block of (N+L) samples is subsequently transmitted. The output of the cyclic prefix block 3 is DMT transmit signals "u" comprising a plurality of time-domain multi-carrier transmit blocks/symbols.

The DMT transmit signals "u" are subsequently passed through a transmitter low-pass filter unit 4 and thence through a digital-to-analogue converter 5 prior to duplex transmission to a remote transceiver.

The receiver portion input 7a is coupled to an analogue-to-digital converter (ADC) 6 arranged to digitise received DMT time-domain signals received from a remote transceiver, and to pass those signals, so digitised, through a receiver filter 7.

Echo cancellation is subsequently applied to the signals output of the receive filter 7 (either immediately or subsequent to further processing of those signals) to produce DMT time-domain echo-cancelled receive signals "e". A cyclic prefix extractor 8 subsequently receives the receive signals "e" and extracts from them any cyclic prefix prepended thereto.

A fast Fourier transform block (FFT) 9 receives the output of the cyclic prefix extractor 8 and de-modulates each of the N real-valued time-domain samples of the echo-cancelled prefix-extracted time-domain samples so as to produce as output therefrom a frequency-domain echo-cancelled receive block "E;" comprising N complex-valued data samples.

An echo cancellation unit (comprising different elements for each embodiment concerned) couples the transmitter portion of the transceiver to the receiver portion thereof between the respective inputs and outputs of both said transceiver portions. The echo canceller, in any of its forms/embodiments, is arranged to provide echo emulation y of an echo signal produced by the echo path between the transmitter and transceiver portions and to subtract an emulated echo from signals received at the receive portion.

Each of the embodiments illustrated in FIGS. 1 to 7 stems from an implementation of the following relations.

As is commonly known, for h being the impulse response of the echo path, the N-point vector y of echo channel output samples can be represented as:

$$y_i = T_{i,i-1} \cdot h \qquad \text{eq. (1)}$$

where $T_{i,i-1}$ is an N×N Toeplitz matrix with symbol length N (i.e. the number of unique time-domain samples per DMT block/symbol excluding any cyclic prefix attached thereto) and cyclic prefix length L, and is derived from a pair of successive multi-carrier transmit blocks "$u_{i-1}$" and "$u_i$" each being N+L samples in length, such that:

$$T = \begin{bmatrix} \overbrace{\begin{matrix} x_1^i \\ x_2^i \\ \cdots \\ \\ \\ \\ \cdots \\ x_{N-1}^i \\ x_N^i \end{matrix}}^{\text{CP of symbol } i} & \overbrace{\begin{matrix} x_N^i & x_{N-1}^i & \cdots & x_{N-L+1}^i & x_N^{i-1} & x_{N-1}^{i-1} & \cdots & x_{L+2}^{i-1} \\ & & & & & & & \cdots \\ & & & & & & & x_{N-1}^{i-1} \\ & & & & & & & x_N^{i-1} \\ & & \cdots & & & & & x_{N-L+1}^i \\ & & & & & & & \cdots \\ & & & & & & & x_N^{i-1} \\ & & & & & & & x_N^i \\ x_{N-1}^i & & \cdots & & & & x_2^i & x_1^i \end{matrix}}^{\text{symbol } i-1} \end{bmatrix} \qquad \text{eq. (2)}$$

Samples $\{\chi^{i-1}\}$ are taken from the cyclic prefix of the former block "$u_{i-1}$" and samples $\{\chi^i\}$ are taken from the latter "$i$". The Toeplitz matrix is not diagonalizable via a fast Fourier transform and solving this equation is computationally intensive. Each of the embodiments illustrated and described in the following paragraphs thereby implements a method whereby the Toeplitz matrix is augmented to produce either a circulant matrix or a symmetric matrix which, in each case, is diagonalizable via a frequency-domain transform operation. Diagonalizable matrices are much simpler and less computationally intensive to use in calculations. Thus, the echo emulation and cancellation methods of the subject invention aim to be simpler compared to the prior art methods.

Referring to FIGS. 1 to 4 and 7, the embodiments illustrated therein implement all the following basic mathematical derivations: —the Toeplitz matrix T in equation (1) will first be augmented to form a (2N×2N) circulant matrix C where:

$$C = \begin{bmatrix} T & S \\ S & T \end{bmatrix} \qquad \text{eq. (3)}$$

$T_1 \equiv T(:,1) = 1^{\text{st}}$ column of $T$ $S_1 \equiv S(:,1) = 1^{\text{st}}$ column of $T$ $C_1 \equiv \begin{bmatrix} T_1 \\ S_1 \end{bmatrix} = 1^{\text{st}}$ column of $C$ and, $$S = \begin{bmatrix} x_1^i & x_N^i & x_{N-1}^i & \cdots & & & x_3^i & x_2^i \\ x_{L+2}^{i-1} & & & & & & & x_3^i \\ \cdots & & & & & & & \\ x_{N-1}^{i-1} & & & & & & & \\ x_N^{i-1} & & & \cdots & & & \cdots & \\ x_{N-L+1}^i & & & & & & & \\ \cdots & & & & & & & x_{N-1}^i \\ x_{N-1}^i & & & & & & & x_N^i \\ x_N^i & x_{N-1}^i & \cdots & x_{N-L+1}^i & x_N^{i-1} & x_{N-1}^{i-1} & \cdots & x_{L+2}^{i-1} & x_1^i \end{bmatrix} \qquad \text{eq. (4)}$$

where S is derived from the elements of T. The matrix C is thereby circulant such that $$C = \begin{bmatrix} T & S \\ S & T \end{bmatrix} = F_{2N}^{-1} \cdot \text{diag}(\lambda_1 \ldots \lambda_{2N}) \cdot F_{2N} \text{ where} \quad \text{eq. (5)}$$

$$\Lambda = \begin{bmatrix} \lambda_1 \\ \lambda_2 \\ \ldots \\ \lambda_{2N} \end{bmatrix} = fft_{2N}(C_1) \quad \text{eq. (6)}$$

in accordance with common general knowledge of matrix algebra whereby a circulant matrix can always be written as a product of its Fourier transform $F_{2N}$ with a diagonal matrix and with its inverse Fourier transform. The vector $C_1$ is the first column of matrix C.

Figure 2:
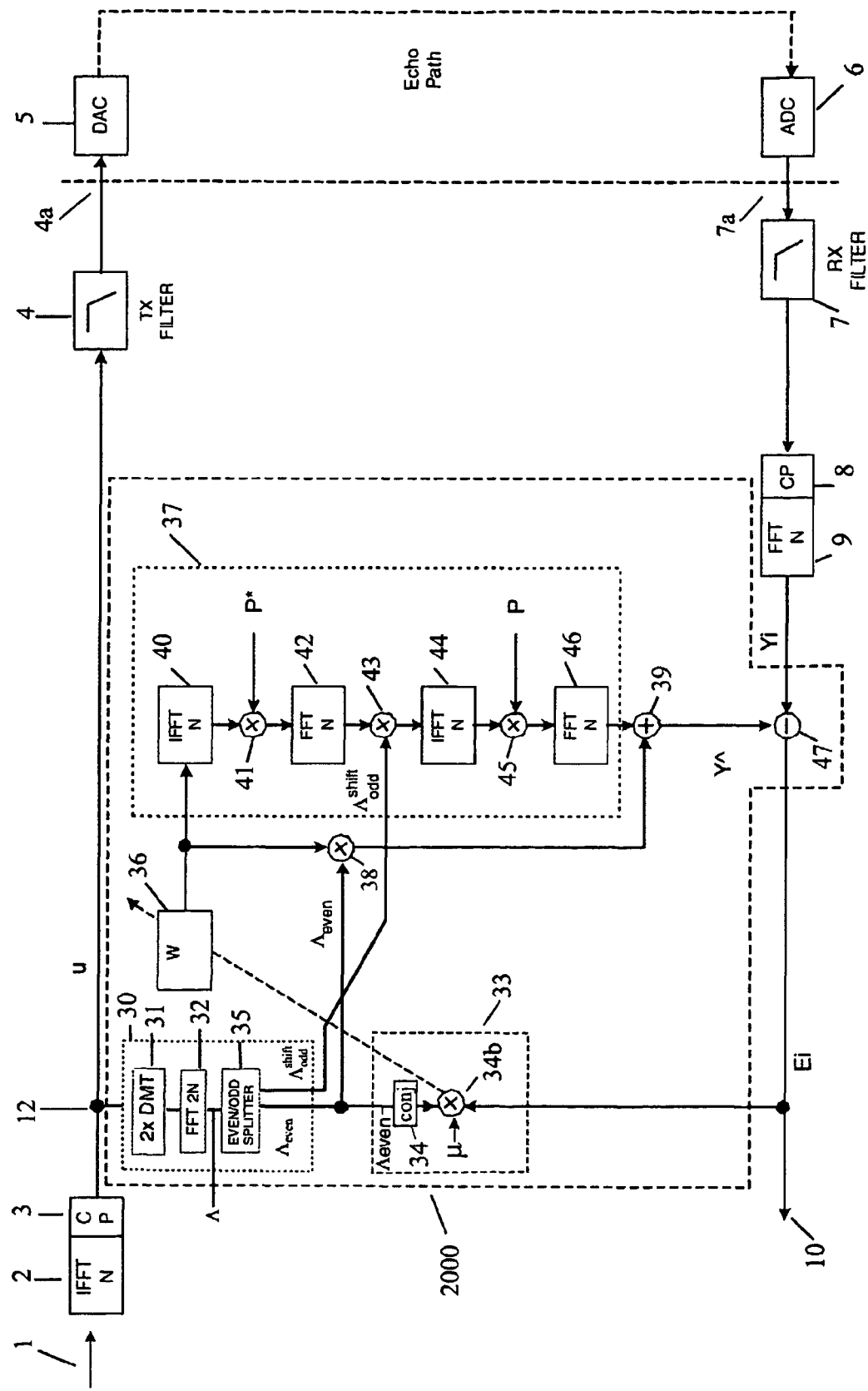
FIG. 2 illustrates a transceiver in which echo emulation and cancellation are performed in the frequency domain in accordance with an embodiment of the present invention.
Figure 3:
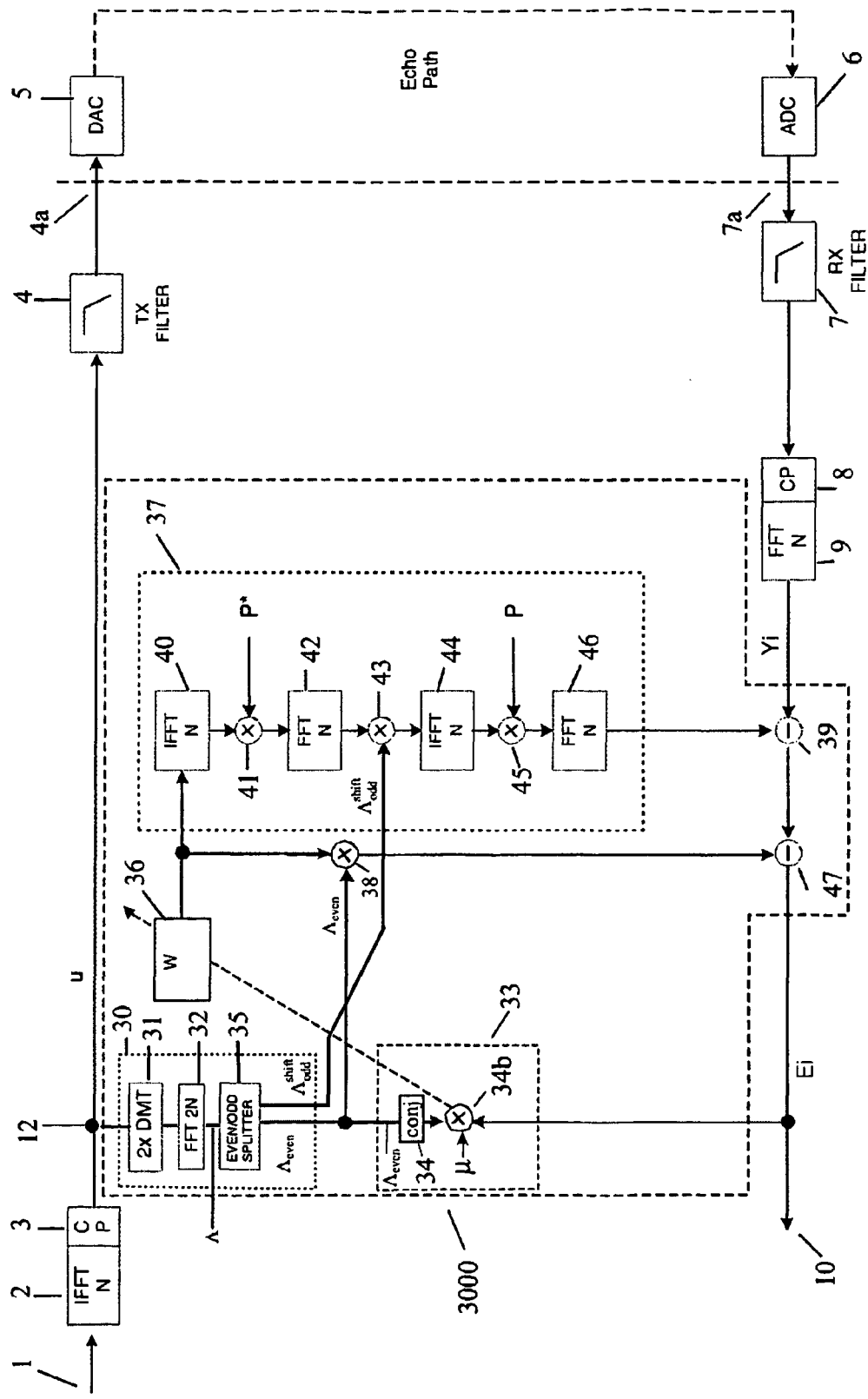
FIG. 3 illustrates a transceiver in which echo emulation and cancellation are performed in the frequency domain in accordance with an embodiment of the present invention.
Figure 4:
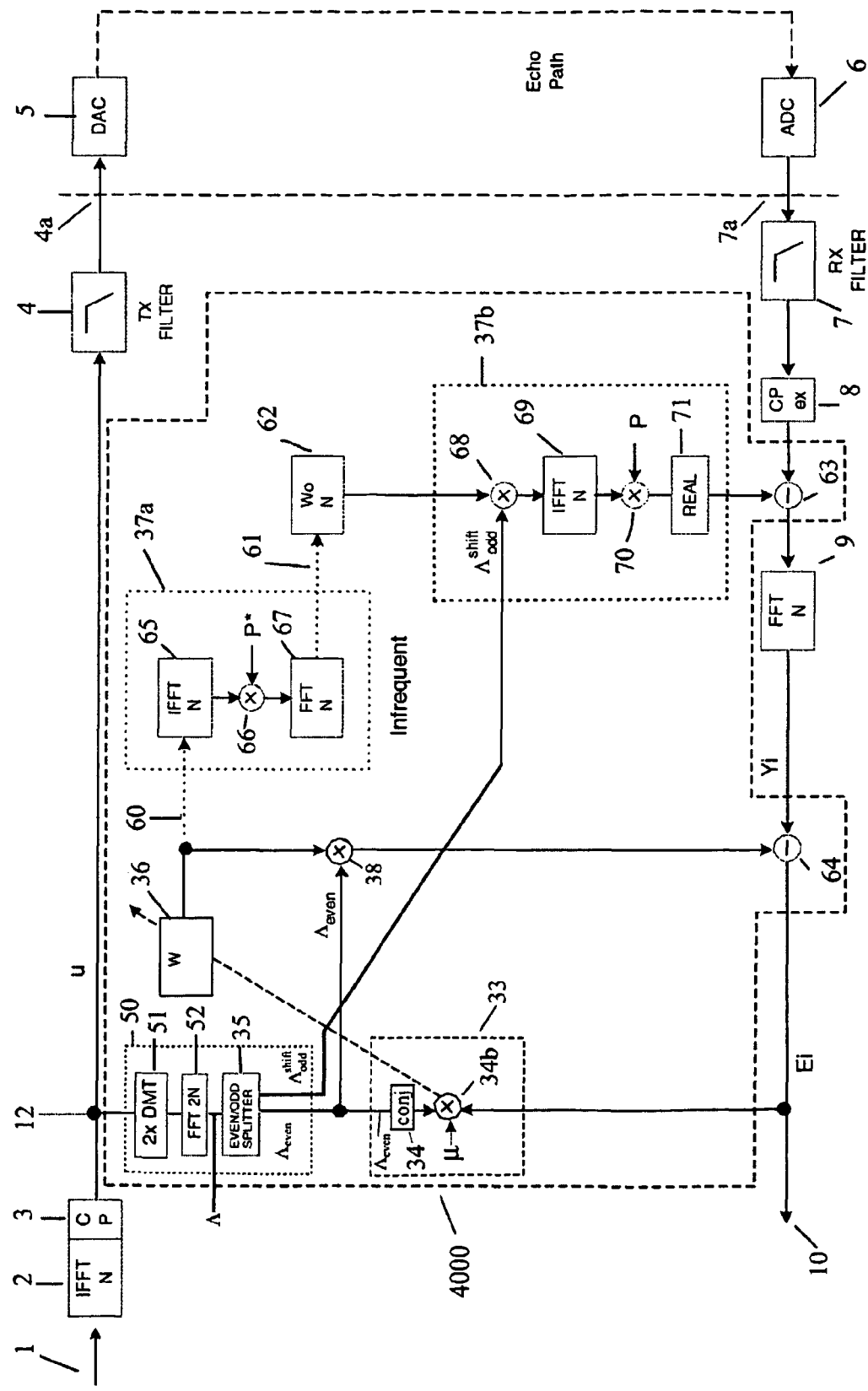
FIG. 4 illustrates a transceiver in which echo emulation is performed in the frequency domain, and echo cancellation is applied in the time-domain and in the frequency-domain in accordance with an embodiment of the present invention.
Figure 7:
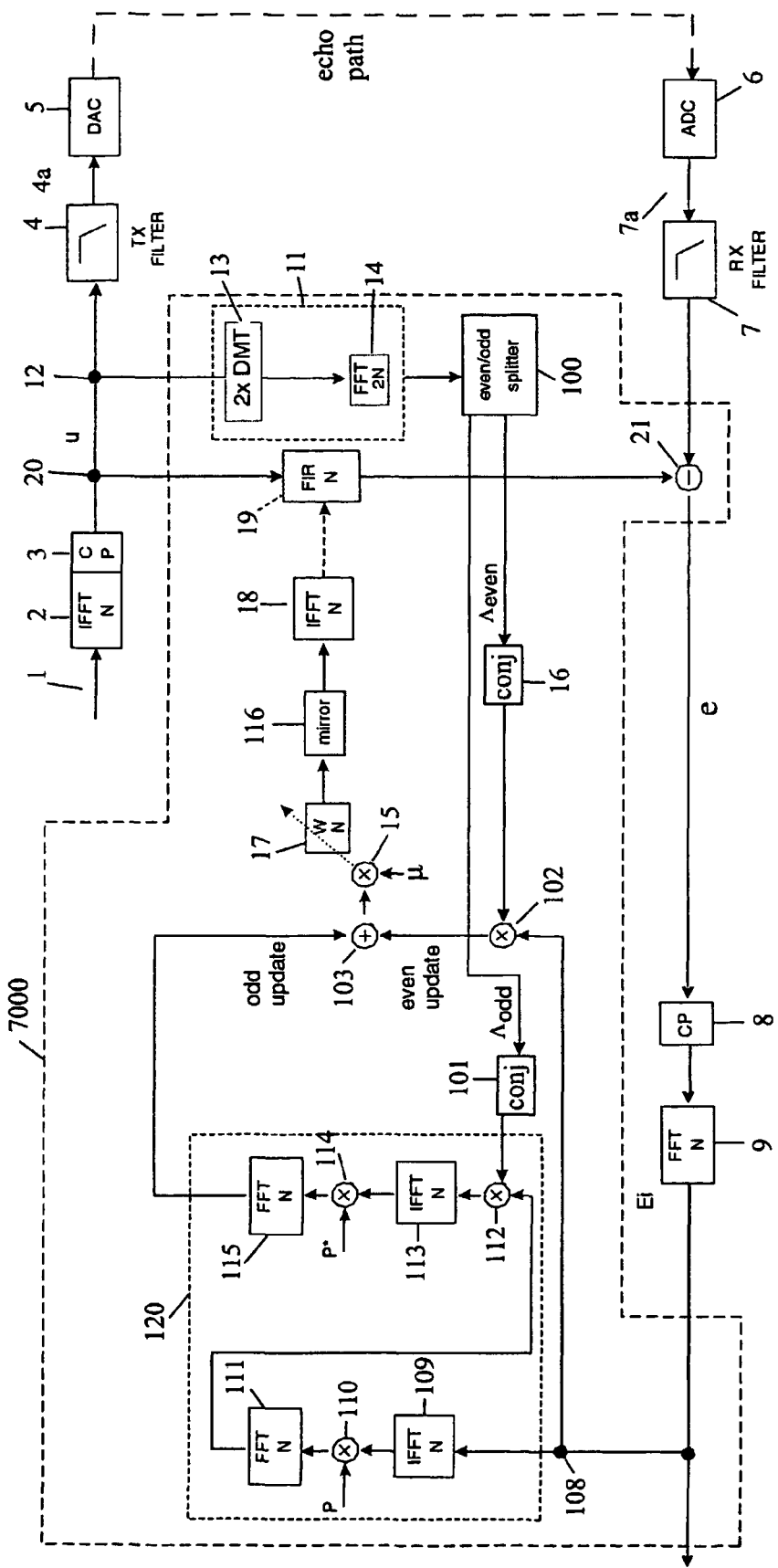
FIG. 7 illustrates a transceiver in which echo emulation is completed in the frequency-domain, and echo cancellation is applied in the time-domain in accordance with an embodiment of the present invention.

Referring now to the embodiments illustrated in FIG. 1 and FIG. 7, and in FIG. 2, FIG. 3 and FIG. 4 only. The embodiments illustrated therein implement the following relations.

By decomposing the Toeplitz matrix T into a sum of a circulant matrix (T+S), and a skew-circulant matrix (T−S), it is possible to write:

$$2T = (T+S) + (T-S) \quad \text{eq. (7)}$$

for which the eigenvalues of the circulant matrix are given by, $$\Lambda_{even} = eig(T+S) = fft_N(T+S)_1 = \Lambda(1:2:\text{end}-1) \quad \text{eq. (8)}$$

and the eigenvalues of the skew-circulant matrix are given by;

$$\Lambda_{odd} = eig(T-S) = \Lambda(2:2:\text{end}). \quad \text{eq. (9)}$$

The real-valued skew-circulant matrix (T−S) can be put in a complex circulant form by means of the diagonal operator P, where;

$$P \equiv \text{diag}(e^{-j\pi n/N}) \ (n = 0 \ldots N-1) \quad \text{eq. (10)}$$

$$T - S = PA_C P^*$$
$$= PF_N^* F_N A_C F_N^* F_N P^*$$
$$= PF_N^* \text{diag}(\Lambda_{odd}^{shift}) F_N P^*$$

The N×1 vector $$\Lambda_{odd}^{shift}$$

is computable directly from the eigenvalue vector $\Lambda$ as follows;

$$\Lambda_{odd}^{shift} = \begin{bmatrix} \lambda_{2N} \\ \lambda_2 \\ \lambda_4 \\ \ldots \\ \lambda_{2N-2} \end{bmatrix} \quad \text{eq. (11)}$$

Thus, restating the equation (eq. (1)) for the echo-channel sample output as;

$$y_i = T \cdot h$$

and thus, $$2y_i = (T+S)h + (T-S)h \quad \text{eq. (12)}$$

one arrives at the result;

$$2Y_i = \text{diag}(\Lambda_{even})H + F_N P F_N^* \text{diag}(\Lambda_{odd}^{shift}) F_N P^* F_N^* H. \quad \text{eq. (13)}$$

where $F_N$ is a Fourier transform operator, and $F^*_N$ is its inverse operator.

This result permits an estimate of $Y_i$ to be to be generated directly in the frequency-domain as follows:

$$E_i = Y_i - \frac{1}{2} \{\text{diag}(\Lambda_{even}) + F_N P F_N^* \cdot \quad \text{eq. (14)}$$
$$\text{diag}(\Lambda_{odd}^{shift}) \cdot F_N P^* F_N^*\} \cdot W_i$$

where the $W_i$ are frequency-domain echo parameters, which may be updated according to the adaptive update formula;

$$W_{i+1} = W_i + \frac{1}{2} \mu \{\text{diag}(\Lambda_{even}) + \quad \text{eq. (15)}$$
$$F_N P F_N^* \cdot \text{diag}(\Lambda_{odd}^{shift}) \cdot F_N P^* F_N^*\}^* \cdot E_i$$

where $E_i$ is the echo-cancelled frequency-domain receive block. The updated echo parameters $W_{i+1}$ may be calculated adaptively using known adaptive update algorithms to estimate the value of the scalar weighting term i, such as the Least Mean Square (LMS) adaptive update algorithm as is well known in the art.

It is to be noted that decimation may be used to derive the relation;

$$Y^F = \frac{1}{2} \{\text{diag}(\Lambda_{even}^F) + F_{N/2} \cdot P^D \cdot F_{N/2}^{-1} \cdot \text{diag}(\Lambda_{odd}^F) \cdot \quad \text{eq. (16)}$$
$$F_{N/2} \cdot P^{D*} \cdot F_{N/2}^{-1}\} \cdot W^F$$

illustrating that one may approximate the exact (un-decimated) formula above by decimating in time by 2 and echo-cancelling over the first N/2 samples of a multi-carrier receive signal only.

In such a decimated technique, the components of the above decimated formula are given by;

$$W^F = \{W(i) + W(i+N/2)\} \ i=1, \ldots, N/2 \quad \text{eq. (17)}$$

$$\Lambda^F = \{\Lambda(i) + \Lambda(i+N)\} \ i=1, \ldots, N \quad \text{eq. (18)}$$

$$\Lambda^F_{even} = \{\Lambda^F(2i)\} \ i=1, \ldots, N/2 \quad \text{eq. (19)}$$

$$\Lambda^F_{odd} = [\Lambda^F(N-1), \Lambda^F(1), \ldots, \Lambda^F(N-3)] \quad \text{eq. (20)}$$

$$P^D = diag(\{e^{-j2\pi k/N}\}) \ k=1, \ldots, N/2 \quad \text{eq. (21)}$$

Referring now to the embodiment illustrated in FIG. 1 only, the embodiment illustrated therein implements the following relations.

Equation (15) may be rearranged by swapping the operators P and P* and replacing the vector $$\Lambda_{odd}^{shift} \text{ with } \Lambda_{odd}.$$

The result is the formula:—

$$W_{i+1} = W_i + \frac{1}{2}\mu\{\text{diag}(\Lambda_{even}) + F_N P^* F_N^* \cdot \text{diag}(\Lambda_{odd}) \cdot F_N P F_N^*\}^* \cdot E_i \quad \text{eq. (22)}$$

This formula, equation (22), permits an update of the frequency-domain echo parameters $W_i$ using the vectors $\Lambda_{even}$ and $\Lambda_{odd}$. Equation (22) may be simplified by disregarding the second term involving $\Lambda_{odd}$.
and writing:

$$W_{i+1} = W_i + \mu \cdot \text{diag}(\Lambda_{even})^* \cdot E_i \quad \text{eq. (23)}$$

From which one may easily derive an update of time-domain echo parameters w, via an inverse (fast) Fourier transform (IFFT):

$$w_{i+1} = \text{ifft}(W_n) \quad \text{eq. (24)}$$

Thus, the echo-path is estimated in the frequency-domain, and echo cancellation may then be implemented in the time-domain according to equation (24). The time-domain coefficients, $W_i$, can be directly used as "taps" for a Finite Impulse Response (FIR) filter in a manner known in the art.

Referring to FIG. 1, there is illustrated an echo canceller (denoted by block 1000) comprising a transmit block generator 11 connected to the output of a cyclic prefix unit 3 (at point 12). The transmit block generator comprises a 2×DMT sampler unit 13 for sampling pairs of consecutive DMT transmit block/symbols "$u_{i-1}$" and "$u_1$" and for generating the 2N×1 vector $[T_1; S_1]$ therefrom, for input to a fast Fourier transform (FFT) unit 14. The FFT unit 14 generates a transmit block comprising 2N frequency-domain data samples, and inputs the transmit block into an "even/odd splitter" signal splitter unit 14b. The signal divider unit 14b is arranged to generate a first transmit sub-block $\text{diag}(\Lambda_{even})$ and a second transmit sub-block $$\text{diag}(\Lambda_{odd}^{shift})$$

which are each derived from the transmit block vector derived from the input received from the 2×DMT unit 13. The first transmit sub-block comprises the even-numbered (i.e. $2^{nd}$, $4^{th}$, $6^{th}$, ...) data elements of the transmit block while the second transmit sub-block comprises the remaining odd-numbered elements thereof. The signal divider unit 14b outputs each of the first and second transmit sub-blocks on separate output ports.

In alternative embodiments the FFT unit 14 may not generate a second transmit sub-block $$\text{diag}(\Lambda_{odd}^{shift}).$$

Figure 8:
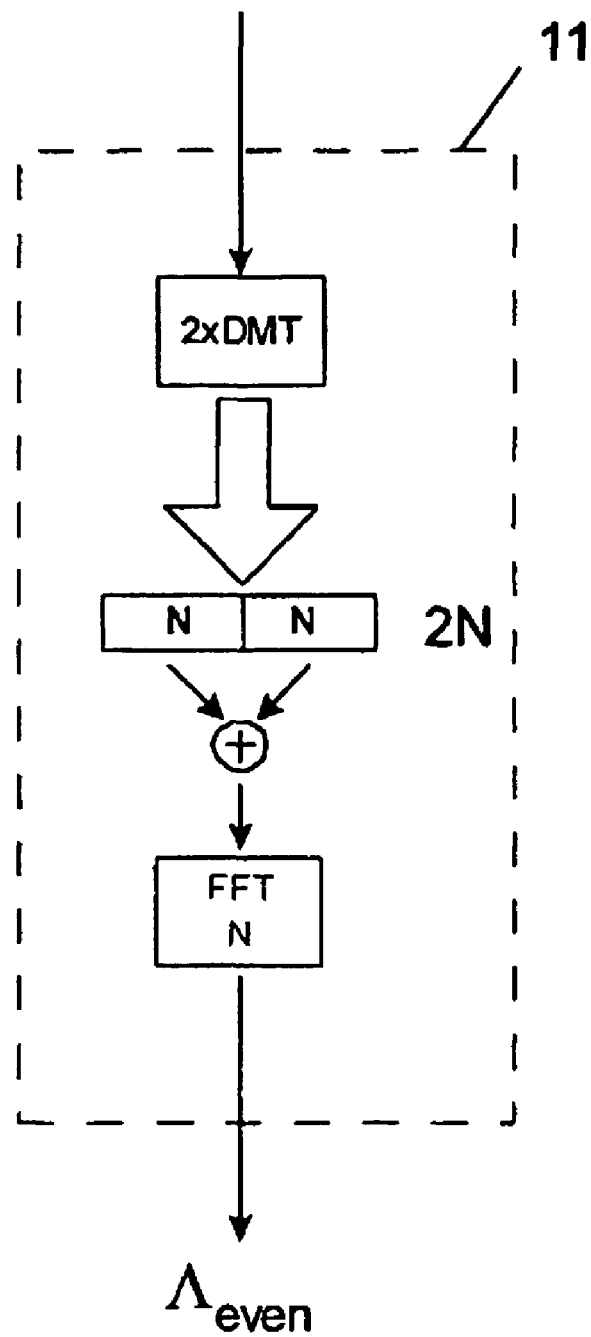
FIG. 8 illustrates a frequency-domain transmit block generator arranged to generate only one frequency-domain transmit sub-block in accordance with an embodiment of the present invention.

FIG. 8 illustrates an alternative such arrangement for the transmit block generator 11 in which the vector x of 2N time-domain data samples generated by the 2×DMT unit transmit block is portioned into a first half portion and a second half portion, each portion being of N data elements. These two portions are then added together to effect a "folding" of the transmit block as follows:

$$x_{folded} = x(1:\text{end}/2) + x(\text{end}/2+1:\text{end})$$

where x(1:end/2) is the first half portion of the transmit block and x(end/2+1: end) is the second half portion. This requires that the subsequent FFT operation upon the folded time samples, which results in the production of only the first transmit sub-block:

$$\Lambda_{even} = \text{fft}_N(x_{folded})$$

An N-point transform requires less computation than the 2N-point FFT employed in the transmit block generator of FIG. 1.

The transmit block generator 11 is arranged to output only the first transmit sub-block $\text{diag}(\Lambda_{even})$ for input to a conjugator unit 16 of an updating unit 15 which is arranged to form the complex conjugate of data input thereto and to output that conjugated data to a multiplier unit 16b of the echo parameter updating unit 15.

The multiplier unit 16b of the echo canceller is arranged to receive as input the first transmit sub-block $\text{diag}(\Lambda_{even})$ output from the conjugator unit 16, a scalar weighting term calculated according to an LMS algorithm such as is well known in the art, and an echo-cancelled frequency-domain receive block $E_i$. The multiplier unit 16b is operable to generate frequency domain echo update parameters by multiplying together the inputs received thereby to form the quantity $\mu \cdot \text{diag}(\Lambda_{even})^* \cdot E_i$.

Updating of the frequency-domain echo parameters W is performed on condition that such an update is needed, this is a condition predetermined by the updating LMS algorithm employed. The update, when applied, is input to an echo parameter generator 17 by the updating unit 15. The echo parameter generator 17 contains either initial or earlier echo parameters $W_i$ which, upon receipt of update parameters from the updating unit 15, are updated by the echo parameter generator 17 to form new parameters $W_i$ according to the formula:

$$W_{i+1} = W_i + \mu \cdot \text{diag}(\Lambda_{even})^* \cdot E_i \quad \text{eq. (25)}$$

The echo parameter generator 17 infrequently provides echo parameters (when updated or otherwise) as an input to a time-domain echo parameter generator 18 which generates time-domain echo parameters from received frequency-domain echo parameters according to the relation:

$$w_{EC} = \text{ifft}(W_i) \quad \text{eq. (26)}$$

where the time-domain echo parameter generator 18 is arranged to perform an N-point inverse Fourier transform on the received frequency-domain echo parameters so as to produce the time-domain echo parameters.

These time-domain echo parameters are copied into a finite-impulse response (FIR) filter 19 by the time-domain echo parameter generator 18. The echo canceller is connected to the transmitter portion of the transceiver at point 20 so as to direct through the FIR filter 19 the same DMT data blocks/symbols from which the time-domain echo parameters were derived by the echo canceller and, consequently, generate at the output of the FIR filter 19 an echo emulation signal y in the time-domain.

The output of the FIR filter 19 is connected to the receiver portion of the transceiver via a subtracting means 21 of the echo canceller arranged to receive both the output of the FIR filter 19 and time-domain receive signals from the output of the receiver filter 7, and to subtract the former output from the latter output. The result is an time-domain echo-cancelled receive signal "e" which, subsequent to cyclic prefix extraction and demodulation be the cyclic prefix extractor 8 and FFT unit 9 of the receiver portion, becomes the frequency-domain echo-cancelled receive block $E_i$.

The receive block generator of the echo canceller comprises a data input connected to the output of the FFT unit 9 of the receiver portion of the transceiver, and a data output connected to a data input of the updater unit 15 as described above. Thus, samples of the frequency-domain echo-cancelled receive block $E_i$ are input thereby to the updater unit 15 for use in frequency-domain update parameter generation.

Thus, it can be seem that echo emulation may be performed by adaptively generating echo parameters surely in the frequency-domain, and then applying those echo parameters to time-domain echo emulation and echo cancellation.

FIG. 7 illustrates an alternative arrangement for implementing all components of the update formula of equation (22). Referring to FIG. 7, there is illustrated an echo canceller (denoted by block 7000) comprising a transmit-block generator 11 connected to the output of a cyclic prefix unit 3 (at point 12). The transmit block generator comprises a 2×DMT sampler unit 13 for sampling pairs of consecutive DMT transmit-blocks/symbols "$u_{i-1}$" and "$u_i$" and generating the 2N×1 vector $[T_1; S_1]$ therefrom for input to a fast Fourier transform (FFT) unit 14. The FFT unit 14 generates a vector from the input received from the 2×DMT unit 13. The transmit block generator 11 is arranged to output data comprising both the first transmit sub-block diag($\Lambda_{even}$) and the second transmit sub-block diag($\Lambda_{odd}^{shift}$) to a signal divider unit 100. The signal divider unit comprises an even/odd splitter arranged to output the first transmit sub-block via a first output, and to output a modified version of the second transmit sub-block via a second and separate output. The modified second transmit sub-block output from the signal divider unit 100 takes the form diag($\Lambda_{odd}$). The first transmit sub-block is input to a conjugator unit 16 which forms the complex conjugate of the first transmit sub-block so received, and outputs the result to a multiplier unit 102.

Similarly, the modified second transmit sub-block diag ($\Lambda_{odd}$) output by the signal divider unit 100 is input to a conjugator unit 101 the output of which is fed to a transform unit 120. Both the transformer unit 120 and the first multiplier unit 102 are arranged to receive echo-cancelled receive blocks $E_i$ from the receive block generator output 108. The first multiplier unit 102 multiplies the echo-cancelled receive block $E_i$ input thereto with the complex conjugate of the first transmit sub-block concurrently input thereto, and outputs the result as an "even update" to an input of an adder unit 103. Similarly, the transformer unit 120, upon receipt of the echo-cancelled receive block $E_i$ from the output 108 of the receive block generator, transforms the receive block E; according to a first predetermined transform operation. The receive block so transformed is subsequently output as an "odd update" for input to a second input of the adder unit 103.

The adder unit 103 thereby generates the sum:

$$(diag(\Lambda_{even}) + F_N P^* F^*_N \cdot diag(\Lambda_{odd}) \cdot F_N P F^*_N) \cdot E_i$$

which represents the sum of the odd update and the even update. This sum is subsequently input to multiplier unit 15 which is operable to generate frequency domain echo update parameters by multiplying together the inputs received thereby to form the quantity arising in the second term of equation (22) where the scalar weighting term is calculated according to an LMS algorithm such as is well known in the art.

Updating of the frequency-domain echo parameters W is performed on condition that such an update is needed, this is a condition predetermined by the updating LMS algorithm employed. The update, when applied, is input to an echo parameter generator 17 by the multiplier and updating unit 15. The echo parameter generator 17 contains either initial or earlier echo parameters $W_i$ which, upon receipt of update parameters from the multiplying and updating unit 15, are updated by the echo parameter generator 17 to form new parameters $W_i$ according to the equation (22). The echo parameter generator 17 infrequently provides echo parameters (when updated or otherwise) as an input to the time-domain echo parameter generator comprising mirror unit 116 and inverse fast Fourier transform (IFFT) unit 18, this being an N-point transform unit. The time-domain echo parameter generator generates time-domain echo parameters from received frequency-domain echo parameters according to equation (24).

The mirror unit 116 is arranged to construct a Hermitian mirror (complex conjugate) of received frequency-domain echo parameters, the IFFT unit 18 is arranged to produce time-domain echo parameters from the output of mirror unit 116.

These time-domain echo parameters are copied into a finite-impulse response (FIR) filter 19 by the time-domain echo parameter generator. The echo canceller is connected to the transmitter portion of the transceiver at point 20 so as to direct through the FIR filter 19 the same DMT data blocks/symbols from which the time-domain echo parameters were derived by the echo canceller and, consequently, generate at the output of the FIR filter 19 and echo emulation signal y in the time-domain.

The output of the FIR filter 19 is connected to the receiver portion of the transceiver via a subtracting means 21 of the echo canceller arranged to receive both the output of the FIR filter 19 and the time-domain receive signals from the output of the receiver filter 7, and to subtract the former output from the latter output. The result is a time-domain echo-cancelled receive signal "e" which, subsequent to cyclic prefix extraction and demodulation by the cyclic prefix extractor 8 and FFT unit 9 of the receiver portion, becomes the frequency-domain echo-cancelled receive block $E_i$. The transformer unit 120 comprises the following components connected in sequence: a first N-point inverse fast Fourier transform (IFFT) unit 109, a first operator multiplier unit 110, a first N-point fast Fourier transform unit (FFT) 111, a second multiplier unit 112, a second N-point IFFT unit 113, a second operator multiplier unit 114, and a second N-point FFT unit 115. The first N-point IFFT unit 109 is arranged to receive the echo-cancelled receive block $E_i$ emanating from the output 108 of the receive block generator, to transform that received data accordingly and to output the result as a first input to the first operator multiplier unit 110. The first operator multiplier unit is arranged to receive as a second input a parameter block representing the diagonal operator P, to pre-multiply its first input with the parameter block of its second input and to output the result to an input of the first N-point FFT unit 111. The first N-point FFT unit 111 is arranged to transform its input accordingly and to output the result to a first input of the second multiplier unit 112.

The second multiplier unit is also arranged to receive as a second input the second transmit sub-block diag($\Lambda_{odd}$) (as modified) from the second conjugator unit 101, to pre-multiply its first input with its second input and to output the result to the input of a second N-point IFFT unit 113.

The second N-point IFFT unit 113 is arranged to transform its input accordingly and to output the result to a first input of the second operator multiplier unit 114. The second operator unit arranged to receive as a second input a parameter block representing the inverse of the diagonal operator P, to pre-multiply its first input with the parameter block of its second input and to output the results to an input of the first FFT unit 115. The second N-point FFT unit 115 is arranged to transform its input accordingly and to output the result as a second echo sub-component and as the output of the transformer unit 120 for input to the adder unit 103 as the odd update.

Referring to FIG. 2, there is illustrated an echo canceller (denoted by block 2000) comprising a transmit block generator 30 connected to the output of the cyclic prefix unit 3 (at point 12). The transmit block generator comprises a 2×DMT sampler unit 31 for sampling pairs of consecutive DMT transmit blocks/symbols "$u_{i-1}$" and "$u_i$" and generating the 2N×1 vector $[T_1; S_1]$ therefrom for input to a fast Fourier transform (FFT) unit 32. The FFT unit 32 generates a transmit block comprising 2N frequency-domain data samples, and inputs the transmit block into an "even/odd splitter" signal divider unit 35. The signal divider unit 35 is arranged to generate a first transmit sub-block $diag(\Lambda_{even})$ and a second transmit sub-block $$diag(\Lambda_{odd}^{shift})$$

which are each derived from the transmit block vector derived from the input received from the 2×DMT unit 31. The first transmit sub-block comprises the even-numbered (i.e. $2^{nd}$, $4^{th}$, $6^{th}$, ...) data elements of the transmit block while the second transmit sub-block comprises the remaining odd-numbered elements thereof. The signal divider unit 35 outputs each of the first and second transmit sub-blocks on separate output ports.

The transmit block generator 30 is arranged to input only the first transmit sub-block $diag(\Lambda_{even})$ to a conjugator unit 34 of an echo parameter updating unit 33. The conjugator unit 34 is arranged to form the complex conjugate of data input thereto and to output the result to multiplier unit 34b. The transmit block generator is arranged to output both the first transmit sub-block and the second transmit sub-block $$diag(\Lambda_{odd}^{shift})$$

to separate multiplier units 38 and 43 respectively for subsequent use as will be explained below.

The multiplier unit 34b of the echo canceller is arranged to receive as input the complex conjugate of the first transmit sub-block $diag(\Lambda_{even})$ from the conjugator unit 34, a scalar weighting term calculated according to an LMS algorithm such as is well known in the art and an echo-cancelled frequency-domain receive block $E_i$.

The multiplier unit 34b is operable to generate frequency domain echo update parameters by multiplying together the inputs received thereby to form the quantity, arising in eq. (25), namely;

$$\mu\{diag(\Lambda_{even})\}^* \cdot E_i \qquad \text{eq. (27)}$$

Updating of the frequency-domain echo parameters W is performed on condition that such an update is needed, this is a condition predetermined by the updating LMS algorithm employed. The update, when applied, is input to an echo parameter generator 36 by the updating unit 33. The echo parameter generator 36 contains either initial or earlier echo parameters $W_i$ which, upon receipt of update parameters from the updating unit 33, are updated by the echo parameter generator 36 to form new parameters $W_{i+1}$ according to the formula given by eq. (25), namely:

$$W_{i+1} = W_i + \mu\{diag(\Lambda_{even})\}^* \cdot E_i$$

The echo parameter generator 36 and the transmit block generator 30 respectively provide echo parameters (when updated or otherwise) and transmit blocks as an input to an echo component generator. The echo component generator in question is arranged to receive first and second transmit sub-blocks from the signal divider unit 35. The echo component generator comprises a first multiplier unit 38, a transformer unit 37 and an adder unit 39. The signal divider unit 35 is arranged to generate a first transmit sub-block $diag(\Lambda_{even})$ and a second transmit sub-block $$diag(\Lambda_{odd}^{shift})$$

and to direct the first transmit sub-block to an input of the first multiplier unit 38, while simultaneously to direct the second transmit sub-block to an input of the transformer unit 37 so as to be transformed thereby according to a first predetermined transform operation.

The echo parameter generator 36 is arranged to simultaneously input echo parameters to the first multiplier unit 38 and the transformer unit 37 for pre-multiplication by the first transmit sub-block and the second transmit sub-block (transformed according to the first transform operation) respectively thereby to produce a first and a second echo sub-component. The outputs of the first multiplier unit 38 and the transformer means 37 are directed to inputs of the adder unit 39 which adds those inputs together to provide as output a frequency-domain echo component $Y^\Lambda$, as defined in the second term of eq. (14), namely:

$$Y^\Lambda = \frac{1}{2}\{diag(\Lambda_{even}) + F_N P F_N^* \cdot diag(\Lambda_{odd}^{shift}) \cdot F_N P^* F_N^*\} \cdot W_i$$

The transformer unit 37 comprises the following components connected in sequence: a first N-point inverse fast Fourier transform (IFFT) unit 40, a first operator multiplier unit 41, a first N-point fast Fourier transform unit (FFT) 42, a second multiplier unit 43, a second N-point inverse fast Fourier transform (IFFT) unit 44, a second operator multiplier unit 45, and a second N-point fast Fourier transform unit (FFT) 46.

The first N-point inverse fast Fourier transform (IFFT) unit 40 is arranged to receive echo parameters input from the echo parameter generator 36, to transform those parameters accordingly and to output the result as a first input of the first operator multiplier unit 41. The first operator unit is also arranged to receive as a second input a parameter block representing the inverse of the diagonal operator P, to pre-multiply its first input with the parameter block of its second input and to output the result to an input of the first N-point fast Fourier transform unit 42. The first N-point fast Fourier transform (FFT) unit 42 is arranged to transform its input accordingly and to output the result as a first input of the second multiplier unit 43.

The second multiplier unit is also arranged to receive as a second input the second transmit sub-block from the transmit block generator, to pre-multiply its first input with its second input and to output the result to the input of the second N-point inverse fast Fourier transform (IFFT) unit 44.

The second N-point inverse fast Fourier transform (IFFT) unit 44 is arranged to transform its input accordingly and to output the result as a first input of the second operator multiplier unit 45. The second operator unit is also arranged to receive as a second input a parameter block representing the diagonal operator P, to pre-multiply its first input with the parameter block of its second input and to output the result to an input of the first fast Fourier transform unit 46. The second N-point fast Fourier transform (FFT) unit 46 is arranged to transform its input accordingly and to output the result as the second echo sub-component and the output of the transformer unit 37.

The echo canceller is connected to the receiver portion of the transceiver via a subtracting unit 47 having as one input the output of the adder unit 39 of the echo component generator, and as another input the output of the FFT unit 9 of the receiver portion. The subtracting unit 47 is arranged to subtract the frequency-domain echo component received at the one input from the frequency-domain receive block received at the other input so as to produce a frequency-domain echo-cancelled receive block $E_i$.

The receive block generator of the echo canceller comprises a data input connected to the output of the subtractor unit 47 of the echo canceller, and a data output connected to a data input of the updater unit 33 as described above. Thus, samples of the frequency-domain echo-cancelled receive block $E_i$ are input to the updater unit 33 for use in frequency-domain update parameter generation.

The effect of the echo component generator is to construct the quantity arising in eq. (25), namely:

$$\mu \cdot \{diag(\Lambda_{even})\} \cdot W \qquad \text{eq. (25)}$$

Note that in alternative embodiments according to the present invention, the parameter and transform blocks constructed by the echo component generator in constructing the quantity;

$$\frac{1}{2}\{diag(\Lambda_{even}) + F_N P F_N^* \cdot diag(\Lambda_{odd}^{shift}) \cdot F_N P^* F_N^*\} \qquad \text{eq. (28)}$$

may be stored for use in generating update parameters in the update unit which may then easily construct the quantity;

$$\frac{1}{2}\mu\{diag(\Lambda_{even}) + F_N P F_N^* \cdot diag(\Lambda_{odd}^{shift}) \cdot F_N P^* F_N^*\}^* \cdot E_i$$

for use in full update parameter generation as in eq. (15) or eq. (22) and the embodiments implementing those equations.

In an alternative arrangement illustrated in FIG. 3, there is denoted an echo canceller block 3000 in which the adder unit 39 of the echo component generator is omitted and replaced by a second subtracting unit 47 which, together with a first subtracting unit 39, couples the echo canceller to the receiver portion of the transceiver. The first subtracting unit 39 receives as input a frequency-domain receive block and a second echo sub-component, and subtracts the latter from the former and outputs the result. The second subtracting unit 47 receives as input the output of the first subtracting unit and a second echo sub-component, and subtracts the latter from the former and output the result as frequency-domain echo-cancelled receive block.

Thus, it can be seen that echo emulation may be performed by adaptively generating echo parameters purely in the frequency-domain, and those echo parameters applied to frequency-domain echo emulation and echo cancellation.

Referring to FIG. 4 there is illustrated an echo canceller in block 4000 according to an alternative arrangement in which the transformer unit 37 is divided into two portions 37a and 37b.

The first transformer unit portion 37a comprises the following components connected in sequence: a first N-point inverse fast Fourier transform (IFFT) unit 65, a first operator multiplier unit 66, and a first N-point fast Fourier transform unit (FFT) 67.

An intermediate echo parameter storage unit 62 separates the two portions 37a and 37b of the transformer unit 37.

The second transformer unit portion 37b comprises the following components connected in sequence: a second multiplier unit 68, a first N-point inverse fast Fourier transform (IFFT) unit 69, a second operator multiplier unit 70, and a real-component generator unit 71.

In the transform unit sub-part 37a, the first N-point inverse fast Fourier transform (IFFT) unit 65 is arranged to infrequently receive echo parameters as input 60 from the echo parameter generator 36, to transform those parameters accordingly and to output the result as a first input of the first operator multiplier unit 66. The first operator unit is also arranged to receive as a second input a parameter block representing the diagonal operator P*, being the inverse of P where $P=diag(\{e^{-j\pi k/N}\})$, $(k=1, \ldots, N/2)$. The first operator is arranged to pre-multiply its first input with the parameter block of its second input and to output the result to an input of the first fast Fourier transform unit 67. The first N-point fast Fourier transform (FFT) unit 67 is arranged to transform its input accordingly and to output the result as a first input of the intermediate echo parameter storage unit 62 for storage therein. This operation occurs infrequently relative to the operation of the second portion 37b of the transformer unit.

The second portion 37b of the transformer unit is arranged to frequently receive stored intermediate echo parameters from storage unit 62, and at the same frequency, receive as a second input second transmit sub-blocks which have been generated in respect of several or numerous successive pairs of multi-carrier transmit symbols. Thus, the stored intermediate echo parameters, generated easily using N-point transforms and operators P, are stored for a predetermined period and used repeatedly (without update) as input to the second portion 37b of the transform unit. This technique significantly reduces the complexity and effort of generating the second frequency-domain echo sub-component.

The second multiplier unit 68, second N-point IFFT unit 69 and second operator multiplier unit 70 are substantially the same as those described in respect of FIG. 3. However, the second N-point fast Fourier transform (FFT) unit 46 is omitted and replaced with real-value unit 71 which receives the complex-valued time-domain output of the unit 70 and, in turn, generates as its output the real part of its input as the second echo sub-component and the output of the transformer unit 37b.

The output of the transformer unit 37b is coupled to the receiver portion of the transceiver via a first subtracting unit 63 arranged to receive the second echo sub-component output of the transformer unit 37b, and the output of the cyclic prefix extractor 8 and to subtract the former from the latter and input the result to the N-point FFT unit 9 for demodulation to produce frequency domain receive signal Yi. The first echo sub-component is subsequently subtracted from the receive signal Yi via second subtracting unit 64.

Figure 5:
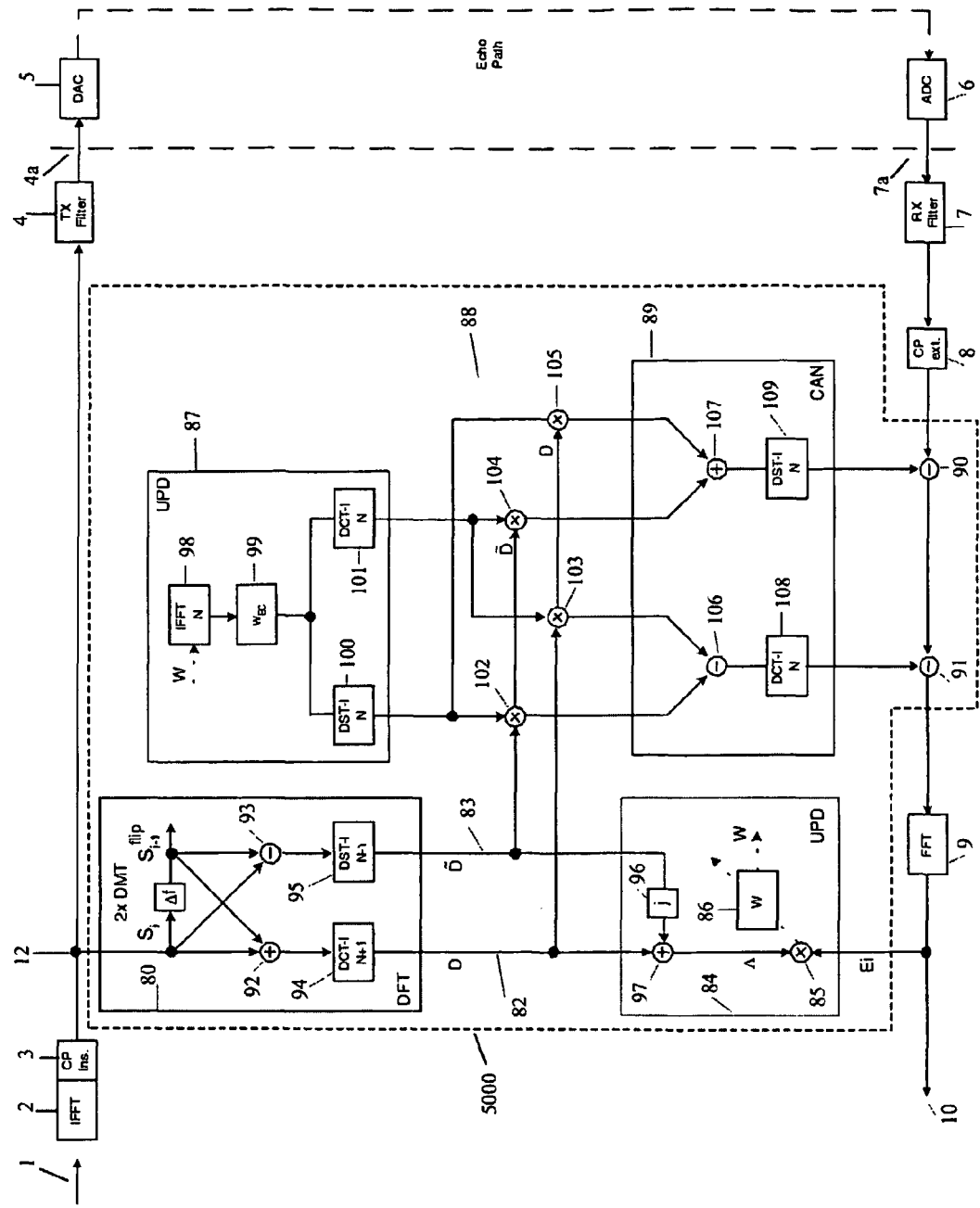
FIG. 5 illustrates a transceiver in which echo emulation is completed in the frequency-domain, and echo cancellation is applied in the time-domain in accordance with an embodiment of the present invention.
Figure 6:
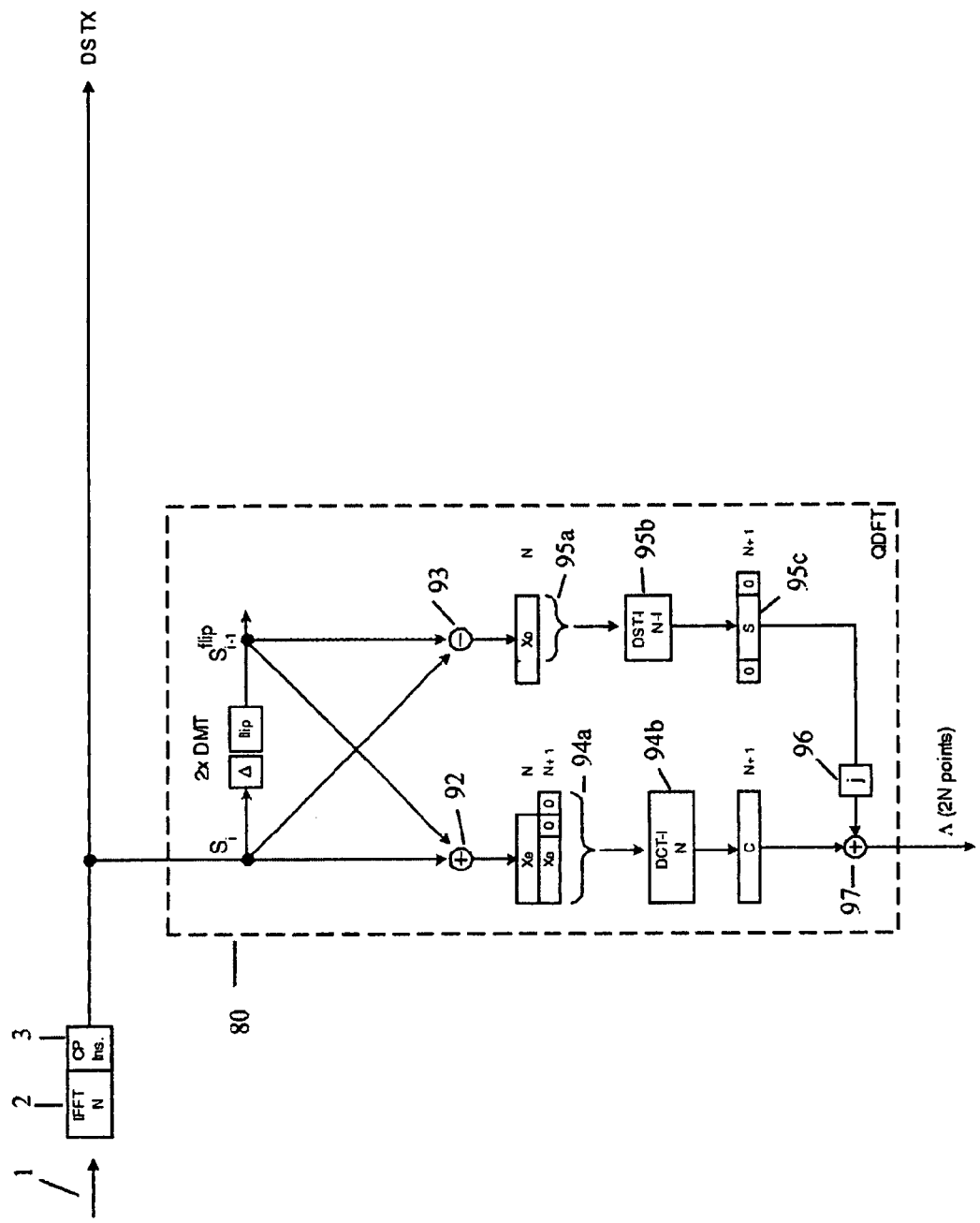
FIG. 6 illustrates a transmit block generator according to the transceiver of FIG. 5.

Referring to FIG. 5 and FIG. 6, the embodiments illustrated therein implement the Toeplitz matrix T of the echo path (defined earlier) as a matrix augmented with Hankel matrices to form symmetric and anti-symmetric matrices as follows.

In view of the echo path sample equation $y_i = T \cdot h$, consider the following matrices;

$$R = \begin{bmatrix} 0 & 1 & \cdots & 0 & 0 \\ \vdots & & \ddots & & \vdots \\ 0 & 0 & \cdots & 1 & 0 \end{bmatrix} = [0|I_{N-1}|0] \qquad \text{eq. (44)}$$

where $I_{N-1}$ is the identity matrix and R is a matrix of dimension $(N+1) \times (N-1)$, and the $(N+1) \times (N+1)$ matrix $C_{N+1}^I$ and the $(N-1) \times (N-1)$ matrix $S_{N-1}^I$, are:

$$C_{N+1}^I = \left(\frac{2}{N}\right)^{\frac{1}{2}} \left(\varepsilon_j^N \varepsilon_k^N \cos\frac{jk\pi}{N}\right)_{j,k=0\ldots N} \qquad \text{eq. (45)}$$

and $$S_{N-1}^I = \left(\frac{2}{N}\right)^{\frac{1}{2}} \left(\sin\frac{(j+1)(k+1)\pi}{N}\right)_{j,k=0\ldots N-2} \qquad \text{eq. (46)}$$

respectively, while the $(N+1) \times N+1)$ matrix $\tilde{C}_{N+1}^I$ and the $(N-1) \times (N-1)$ matrix $\tilde{S}_{N-1}^I$ are:

$$\tilde{C}_{N+1}^I = \left((\varepsilon_k^N)^2 \cos\frac{jk\pi}{N}\right)_{j,k=0\ldots N} \qquad \text{eq. (47)}$$

and $$\tilde{S}_{N-1}^I = \left(\sin\frac{jk\pi}{N}\right)_{j,k=1\ldots N-1} \qquad \text{eq. (48)}$$

where, $$\varepsilon_k^N = \frac{1}{\sqrt{2}}(k=0,N) \quad \varepsilon_k^N = 1 \text{ (otherwise)}.$$

With these matrices, and the Toeplitz matrix T, one may write;

$$T = toeplitz(t_0 t_{-1} \ldots t_{-(N-1)}, t_0 t_1 \ldots t_{(N-1)}) \qquad \text{eq. (49)}$$

from which derives the matrix $T_R$, being equal to the matrix T but with the row and column omitted;

$$T_R = toepiitz(t_0 t_{-1} \ldots t_{-(N-2)}, t_0 t_1 \ldots t_{(N-2)}) \qquad \text{eq. (50)}$$

One may then define the symmetric Toeplitz matrix $\overline{T}_S$ as;

$$\overline{T}_S = T_R + T^*_R = stoeplitz(a_0 \ldots a_{N-2}) \qquad \text{eq. (51)}$$

where stoeplitz$(a_0 \ldots a_{N-2})$ is a symmetric Toeplitz operator which generates a symmetric $(N-1)_x(N-1)$ Toeplitz matrix from the elements $a_0$ to $a_N$.

One may then define the anti-symmetric Toeplitz matrix $\overline{T}_A$ as;

$$\overline{T}_A = T_R - T^*_R = atoeplitz(0 \, b_1 \ldots b_{N-2}) \qquad \text{eq. (52)}$$

where atoeplitz$(0 \, b_1 \ldots b_{N-2})$ is an anti-symmetric Toeplitz operator which generates an anti-symmetric $(N-1) \times (N-1)$ Toeplitz matrix from the elements $b_1$ to $b_{N-2}$.

The elements a and b in eq. (51) and eq. (52) are calculated from the following vectors, using "Matlab" notation:

$$x_e = T_1 + [S_1(1), flipup(S_1(2:end))] \qquad \text{eq (52a)}$$

$$x_o = T_1 - [S_1(1), flipup(S_1(2:end))] \qquad \text{eq. (52b)}$$

where $T_1$ and $S_1$ are vectors equal to the first columns from the matrices S and T respectively, and the operation "flipup" reverses the order of elements within the vector upon which it operates. Consequently, the elements a and b are derived as follows:

$$[a_0 \ldots a_{N-2}] = x_e(1:end-1)$$

$$[b_1 \ldots b_{N-1}] = x_o(2:end)$$

One may further define the symmetric $(N-1) \times (N-1)$ Hankel matrix;

$$\overline{H}_S = shankel(a_2 \ldots a_{N-2} \, 0 \, 0) \qquad \text{eq. (53)}$$

and the anti-symmetric $(N-1) \times (N-1)$ Hankel matrix;

$$\overline{H}_A = ahankel(a_2 \ldots a_{N-1} \, 0). \qquad \text{eq. (54)}$$

From these quantities one can derive the diagonal matrices D and $\tilde{D}$ (of size $(N+1) \times (N+1)$) as;

$$D = diag(\tilde{C}_{N+1}^I \cdot [a_0 \ldots a_{N-2} \, 0 \, 0]) \qquad \text{eq. (55)}$$

and $$\tilde{D} = diag(0 \, \tilde{S}N\text{-}1^I \cdot [b_1 \ldots b_{N-1}] \, 0). \qquad \text{eq. (56)}$$

It can be demonstrated that the following symmetric decomposition relation exists;

$$2T_R = (T_R + T_R^*) + (T_R - T_R^*) \qquad \text{eq (57)}$$

$$= \overline{T}_S + \overline{T}_A + \left(\frac{1}{2}\overline{H}_S - \frac{1}{2}\overline{H}_S\right) + \left(\frac{1}{2}\overline{H}_A - \frac{1}{2}\overline{H}_A\right)$$

$$= \left(\frac{1}{2}\overline{T}_S + \frac{1}{2}\overline{H}_S\right) + \left(\frac{1}{2}\overline{T}_S - \frac{1}{2}\overline{H}_S\right) +$$

$$\left(\frac{1}{2}\overline{T}_A + \frac{1}{2}\overline{H}_A\right) - \left(-\frac{1}{2}\overline{T}_A + \frac{1}{2}\overline{H}_A\right)$$

$$= R^* C_{N+1}^I D C_{N+1}^I R + S_{N-1}^I R^* D R S_{N-1}^I -$$

$$R^* C_{N+1}^I \tilde{D} R S_{N-1}^I + S_{N-1}^I R^* \tilde{D} C_{N+1}^I R$$

from which one may conclude that;

$$T_R = \qquad \text{eq. (58)}$$

$$\frac{1}{2}\left[R^* C_{N+1}^I \left(D C_{N+1}^I R - \tilde{D} R S_{N-1}^I\right) + S_{N-1}^I R^* \left(D R S_{N-1}^I + \tilde{D} C_{N+1}^I R\right)\right]$$

Thus, the Toeplitz system may be expressed as sum of predetermined transformation operations on the diagonal matrices D and $\tilde{D}$ involving discrete cosine and discrete sine transformations in the form of the $(N+1) \times (N+1)$ matrix $C_{N+1}^I$, and the $(N-1) \times (N-1)$ matrix $S_{N-1}^I$, respectively.

This result permits an estimate of $Y_i$ to be to be generated directly in the frequency-domain as follows:

$$E_i = Y_i - \frac{1}{2}\left[R^* C_{N+1}^I \left(D C_{N+1}^I R - \tilde{D} R S_{N-1}^I\right) + \qquad \text{eq. (59)}$$

$$S_{N-1}^I R^* \left(D R S_{N-1}^I + \tilde{D} C_{N+1}^I R\right)\right] \cdot W_i$$

where the $W_i$ are frequency-domain echo parameters, which may be updated according to the adaptive update formula;

$$W^{i+1} = W^i + \frac{1}{2}\mu \qquad \text{eq. (60)}$$

$$\left\{\left[R^* C_{N+1}^I \left(D C_{N+1}^I R - \tilde{D} R S_{N-1}^I\right) + S_{N-1}^I R^* \left(D R S_{N-1}^I + \tilde{D} C_{N+1}^I R\right)\right]\right\}^*$$

$$\cdot E_i$$

where $E_i$ is the echo-cancelled frequency-domain receive block.

The updated echo parameters $W_{i+1}$ may be calculated adaptively using known adaptive update algorithms to estimate the value of the scalar weighting term i, such as the Least Mean Square (LMS) adaptive update algorithm as is well known in the art and discussed above.

Referring to FIGS. 5 and 6 there is illustrated an echo canceller denoted by block 5000 and comprising a transmit block generator 80 connected to the output of the cyclic prefix unit 3 (at point 12). The transmit block generator comprises a 2×DMT sampler unit for sampling pairs of consecutive DMT transmit blocks/symbols "$S_{i-1}$" and "$S_i$" and generating therefrom an N×1 vector $x_e$ and an N×1 vector x. The unit of the 2×DMT unit stores the preceding multi-carrier data block of a sampled pair of such blocks and, upon sampling the succeeding data block of the pair, inputs the preceding block into a "flip" unit where it performs the aforementioned "flipup" operation. Subsequently, the "flipped" preceding data block and the succeeding block of the pair are simultaneously input to an adder unit 92 and a subtracting unit 93. The adder unit 92 performs the sum defined in eq. (52a) while the subtracting unit 93 performs the subtraction set out in eq. (52b).

The N-point discrete cosine transform (DCT) unit 94 has an input unit 94a arranged to receive the N×1 vector $x_e$ and to augment it to an (N+1)×1 vector $x_e = [a_0 \ldots a_{N-2} \, 0 \, 0]$, and a unit 94b for performing an N-point discrete cosine transform on the augmented vector. Similarly, The N-point discrete sine transform (DST) unit 95 has an input unit 95a arranged to receive the N×1 vector $x_o$ and to contract that vector to an (N−1)×1 vector $x_o = [b_1 \ldots b_{N-1}]$, and an unit 95b for performing an N-point discrete sine transform (DST) on the contracted vector.

The DCT unit 94 generates a first transmit sub-block in the form of an (N+1)×1 vector containing the diagonal elements of $D = \text{diag}(\check{C}_{N+1}^I \cdot [a_0 \ldots a_{N-2} \, 0 \, 0])$. An augmenter unit 95c of the DST unit 95 augments the output of the unit 95b to produce the (N+1)×1 vector such that the DST unit 95 generates a second transmit sub-block in the form of an (N+1)×1 vector containing the diagonal elements of $\tilde{D} = \text{diag}(0 \, \tilde{S}_{N-1}^I \cdot [b_1 \ldots b_{N-1}] \, 0)$. The output of the DST unit 95 is subsequently multiplied by the imaginary unit "j" in a multiplier unit 96 which multiplies the real-valued second transmit sub-block with a factor which renders them imaginary numbers. An adder unit 97 subsequently adds the imaginary second transmit sub-block to the real-valued first transmit sub-block so as to generate the complex-valued transmit block in the form of the vector A defined above.

An echo parameter updating unit 85 of the echo canceller is arranged to receive as input the vector A from the adder unit 97, and an echo-cancelled frequency-domain receive block $E_i$.

The updating unit 85 is operable to generate frequency domain echo update parameters by multiplying together the inputs received thereby to form the quantity, $$\frac{1}{2}\mu$$
$$\left\{\left[R^* C_{N+1}^I \left(DC_{N+1}^I R - \tilde{D} RS_{N-1}^I\right) + S_{N-1}^I R^* \left(DRS_{N-1}^I + \tilde{D} C_{N+1}^I R\right)\right]\right\}^* \cdot E_i$$

Eq. (61)

arising in eq. (60) and eq. (59).

Here μ is a scalar weighting term calculated according to an LMS algorithm such as is well known in the art.

Updating of the frequency-domain echo parameters W is performed on condition that such an update is needed, this is a condition predetermined by the updating LMS algorithm employed. The update, when applied, is input to an echo parameter generator 86 by the updating unit 85. The echo parameter generator 86 contains either initial or earlier echo parameters $W_i$ which, upon receipt of update parameters from the updating unit 85, are updated by the echo parameter generator 86 to form new parameters $W_{i+1}$ according to the formula as shown in eq. (60):

$$W^{i+1} = W^i + \frac{1}{2}\mu\left\{\left[R^* C_{N+1}^I \left(DC_{N+1}^I R - \tilde{D} RS_{N-1}^I\right) + S_{N-1}^I R^* \left(DRS_{N-1}^I + \tilde{D} C_{N+1}^I R\right)\right]\right\}^* \cdot E_i$$

The echo parameter generator 86 and the transmit block generator 80 respectively provide echo parameters (when updated or otherwise) and transmit blocks as an input to an echo component generator. The echo component generator in question comprises a first N-point IFFT unit 98 for receiving frequency-domain echo parameters W from the echo parameter generator 86, an echo-parameter store 99 for receiving the output of the IFFT unit 98, a first N-point DST unit 100 and a first N-point DCT unit 101 for receiving in parallel the output of the echo parameter store 99, a set of multiplier units collectively denoted 88, first and second combiner units 106 and 107 for combining selected outputs of the collective multiplier units 88, and a second N-point DST unit 108 and a second N-point DCT unit 109 for receiving in parallel the outputs of the first and second combiner units respectively.

The set of multiplier units collectively denoted 88 are arranged to receive in parallel the output of the first N-point DST unit 100, the output of the first N-point DCT unit 101, the first transmit sub-block output from the transmit block generator 80, and the second transmit sub-block output from the transmit block generator 80.

A first multiplier unit 102 is arranged to receive as inputs the output of the first DST unit 100 and the second transmit sub-block, to pre-multiply the latter with the former, and to output the result to a first input of the first combiner unit 106. Similarly, a second multiplier unit 103 is arranged to receive as inputs the output of the first DCT unit 101 and the first transmit sub-block, to pre-multiply the latter with the former, and to output the result to a second input of the first combiner unit 106. The first combiner unit subtracts its first input from its second input and outputs the result to the second DCT unit 108.

Simultaneously, a third multiplier unit 104 is arranged to receive as inputs the output of the first DCT unit 101 and the second transmit sub-block, to pre-multiply the latter with the former, and to output the result to a first input of the second combiner unit 107. Similarly, a fourth multiplier unit 105 is arranged to receive as inputs the output of the first DST unit 100 and the first transmit sub-block, to pre-multiply the latter with the former, and to output the result to a second input of the second combiner unit 107. The second combiner unit adds its first input to its second input and outputs the result to the second DST unit 109.

Thus the echo component generator comprising collective elements 87, 99 and 89, provides a means for pre-multiplying the echo parameters W with the first and second transmit sub-blocks transformed according to four predetermined transform operations defined by the DCT and DST units, the multiplier units and the combiner units.

The effect is to construct the quantity arising in eq. (59):

$$\frac{1}{2}[R^*C^l_{N+1}(DC^l_{N+1}R - \tilde{D}RS^l_{N-1}) + S^l_{N-1}R^*(DRS^l_{N-1} + \tilde{D}C^l_{N+1}R)] \cdot \quad \text{eq. (61)}$$

$$W_i$$

The parameter and transform blocks constructed by the echo component generator in constructing the quantity arising in eq. (59);

$$\frac{1}{2}[R^*C^l_{N+1}(DC^l_{N+1}R - \tilde{D}RS^l_{N-1}) + S^l_{N-1}R^*(DRS^l_{N-1} + \tilde{D}C^l_{N+1}R)] \quad \text{eq.(62)}$$

are stored for use in generating update parameters in the update unit 85 which may then easily construct the quantity;

$$\frac{1}{2}\mu\{[R^*C^l_{N+1}(DC^l_{N+1}R - \tilde{D}RS^l_{N-1}) + S^l_{N-1}R^*(DRS^l_{N-1} + \tilde{D}C^l_{N+1}R)]\}^* \cdot E_i$$

for use in update parameter generation as shown in eq. (60).

The resultant echo sub-components output from the echo component generator are subtracted from the time-domain receive signal after cyclic prefix extraction thereof.

In particular, the echo canceller of the present embodiment is coupled to the receiver portion of the transceiver via a first subtracting unit 90 and a second subtracting unit 91. The first subtracting unit 90 is arranged to receive as a first input the output of the second DST unit 109 of the echo component generator, and as a second input the time-domain receive signal output from the cyclic prefix extractor 8 of the receiver portion. The subtracting unit subtracts its first input from its second input and outputs the result to a second input of the second subtracting unit 91. The second subtracting unit is arranged to receive as a first input the output of the second DCT unit 108 of the echo component generator, and to subtract its first input from its second input and output the result as a time-domain echo-cancelled receive signal to the input of the FFT unit 9 of the receiver portion for demodulation thereby.

The output of the FFT unit 9 of the receiver portion is thus a frequency-domain echo-cancelled receive block Ei. A sample of this signal is directed to an input of the updating unit 85 for use in update parameter calculation.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An echo canceller comprising:
    echo parameter generator means for generating a plurality of frequency-domain echo parameters from two consecutive time-domain multi-carrier data blocks in a multi-carrier transmit signal from a signal transmission link, wherein each of the multi-carrier data blocks identifies a communication symbol and wherein the echo parameters are generated from a diagnolizable matrix that is calculated using a Toeplitz matrix based upon the two consecutive data blocks;
    echo component generator means for generating an echo signal using the plurality of frequency-domain echo parameters; and
    means arranged to generate an echo-cancelled received signal from a received multi-carrier signal and said echo signal.

2. An echo canceller according to claim 1 wherein the two consecutive time-domain multi-carrier data blocks each includes a first selected number of time-domain data samples, and said echo canceller is arranged to generate said frequency-domain echo parameters from a second selected number of time-domain data samples selected from both of the two consecutive time-domain multi-carrier data blocks, said second selected number being substantially twice said first selected number.

3. An echo canceller according to claim 2 wherein said echo canceller further comprises:
    subtracting means arranged to subtract said echo signal from said received multi-carrier signal in the time domain or in the frequency domain to generate an echo-cancelled received signal;
    transmit block generating means for generating from said second selected number of time-domain data samples a frequency-domain transmit block comprising a third selected number of frequency-domain data samples;
    receive block generating means for generating from echo-cancelled receive signals a frequency-domain echo-cancelled receive block comprising a fourth selected number of frequency-domain data samples;
    updating means responsive to input frequency-domain transmit blocks and responsive to input frequency-domain echo-cancelled receive blocks and arranged to generate therefrom a set of frequency-domain echo update parameters for use in updating said frequency-domain echo parameters;
    means for applying frequency-domain echo update parameters to said frequency-domain echo parameters if a selected condition is met by said frequency-domain echo update parameters.

4. An echo canceller according to claim 3 wherein said transmit block generating means is arranged to generate a frequency-domain transmit block comprising data samples equivalent to eigenvalues of a circulant matrix formed from said second selected number of time-domain data samples selected from the two consecutive time-domain multi-carrier data blocks.

5. An echo canceller according to claim 3, wherein said echo parameter generator is arranged to generate frequency-domain echo parameters representing the frequency response of an echo path through the signal transmission link and through the echo canceller.

6. An echo canceller according to claim 3 wherein:
    said transmit block generating means is arranged to generate from said frequency-domain transmit block a first frequency-domain transmit sub-block and a second frequency-domain transmit sub-block each comprising frequency-domain data samples being selected from said frequency-domain transmit block such that said first and second frequency-domain transmit sub-blocks do not share a common frequency-domain data sample.

7. An echo canceller according to claim 6 wherein said updating means is arranged to:

form a conjugate sub-block being the complex conjugate of said first frequency-domain transmit sub-block; and,
pre-multiply said frequency-domain echo-cancelled receive block with said conjugate sub-block and with a scalar weight term determined in accordance with said selected condition.

8. An echo canceller according to claim 3, wherein:
said updating means is responsive to frequency-domain transmit blocks transformed according to a selected transform operation, and is responsive to said input frequency-domain echo-cancelled receive blocks whereby said receive blocks pre-multiply said frequency-domain transmit blocks so transformed.

9. An echo canceller according to claim 3, wherein:
said transmit block generating means is arranged to generate said third selected number of frequency-domain data samples of said frequency-domain transmit block from said second selected number of time-domain data samples chosen such that said third selected number is substantially equal to said second selected number to the nearest integer; and,
said fourth selected number of frequency-domain samples of said frequency-domain echo-cancelled receive block are chosen such that said fourth selected number is substantially equal to said first selected number to the nearest integer.

10. An echo canceller according to claim 3, wherein said echo component generator is arranged to:
generate time-domain echo parameters from said frequency-domain echo parameters; and to,
apply said time-domain echo parameters to multi-carrier transmit signals so as to generate said echo signal in the time domain.

11. An echo canceller according to claim 10 wherein said echo component generator is arranged to generate time-domain echo parameters so as to form a Finite Impulse Response (FIR) sequence representing the response of an echo path through the echo canceller and the signal transmission link, and said echo component generator includes an FIR filter arranged to receive said multi-carrier transmit signal and said FIR sequence and to apply said FIR sequence to said multi-carrier transmit signal.

12. An echo canceller according to claim 10, wherein said echo component generator is arranged to generate said time-domain echo parameters so as to comprise a fifth selected number of time-domain data samples, said fifth selected number being substantially equal to said first selected number.

13. An echo canceller according to claim 6, wherein said echo component generator includes:
a first multiplying means for pre-multiplying said frequency-domain echo parameters with said first frequency domain transmit sub-block to produce a first echo sub-component; and,
transforming means for transforming said second frequency-domain transmit sub-block according to a first selected transform operation and for pre-multiplying said frequency-domain echo parameters with said frequency-domain sub-block so transformed thereby to generate a second echo sub-component, the echo signal being the sum of said first echo sub-component and said second echo sub-component.

14. An echo canceller according to claim 13 wherein said updating means is arranged to:
generate a first sum being the sum of said first frequency-domain transmit sub-block and said second frequency-domain transmit sub-block transformed according to said first selected transform operation;
generate a second sum being the complex conjugate of said first sum; and to,
pre-multiply said frequency-domain echo-cancelled receive block with said second sum and with a scalar weight term determined in accordance with said selected condition thereby to generate said frequency-domain update parameters.

15. An echo canceller according to claim 13, wherein said transforming means comprises:
a first operator means arranged to generate a first transform parameter block suitable to transform into the time domain frequency domain data blocks pre-multiplied thereby;
a second operator means responsive to an output from said first operator means and arranged to pre-multiply said output of said first operator means with a first operator parameter block;
a third operator means responsive to an output from said second operator means and arranged to pre-multiply said output of said second operator means with a second transform parameter block suitable to transform into the frequency domain time domain data blocks pre-multiplied thereby;
a fourth operator means responsive to an output from said third operator means and arranged to pre-multiply said output of said third operator means with said second frequency-domain transmit sub-block;
a fifth operator means responsive to an output from said fourth operator means and arranged to pre-multiply said output of said fourth operator means with said first transform parameter block;
a sixth operator means responsive to an output from said fifth operator means and arranged to pre-multiply said output of said fifth operator means with a second operator parameter block representing an operation being the inverse of the operation represented by said first operator parameter block;
a seventh operator means responsive to an output from said sixth operator means and arranged to pre-multiply said output of said sixth operator block with said second transform parameter block to form said second frequency-domain transmit sub-block transformed according to said first selected transform operation.

16. An echo canceller according to claim 15 wherein said transforming means and said updating means both employ the same said first transform parameter block, said second transform parameter block, said first operator parameter block, and said second operator parameter block.

17. An echo canceller according to claim 13, wherein said transmit block generating means is arranged to:
generate said first frequency-domain transmit sub-block from data samples equivalent to eigenvalues of a circulant matrix formed from said second selected number of time-domain data samples selected from the two consecutive time-domain multi-carrier data blocks; and to,
generate said second frequency-domain transmit sub-block from data samples equivalent to eigenvalues of a skew-circulant matrix formed from said second selected number of time-domain data samples selected from the two consecutive time-domain multi-carrier data blocks.

18. An echo canceller according to claim 17, wherein said transforming means comprises:
a first operator means arranged to generate a first transform parameter block suitable to transform into the time domain frequency domain data blocks pre-multiplied thereby;

a second operator means responsive to an output from said first operator means and arranged to pre-multiply said output of said first operator means with a first operator parameter block;

a third operator means responsive to an output from said second operator means and arranged to pre-multiply said output of said second operator means with a second transform parameter block suitable to transform into the frequency domain time domain data blocks pre-multiplied thereby;

a fourth operator means responsive to an output from said third operator means and arranged to pre-multiply said output of said third operator means with said second frequency-domain transmit sub-block;

a fifth operator means responsive to an output from said fourth operator means and arranged to pre-multiply said output of said fourth operator means with said first transform parameter block;

a sixth operator means responsive to an output from said fifth operator means and arranged to pre-multiply said output of said fifth operator means with a second operator parameter block representing an operation being the inverse of the operation represented by said first operator parameter block; and a seventh operator means responsive to an output from said sixth operator means and arranged to pre-multiply said output of said sixth operator block with said second transform parameter block to form said second frequency-domain transmit sub-block transformed according to said first selected transform operation; and wherein said first and second operator parameter blocks each represent an operator arranged to render circulant said skew-circulant matrix by operation thereupon.

19. An echo canceller according to claim 15, wherein said echo component generator includes intermediate storage means for storing said output of said third operator means as a set of intermediate frequency-domain echo parameters and said echo component generator is arranged to:

generate said second echo sub-component in respect of a first pair of multi-carrier data blocks by infrequently pre-multiplying said frequency-domain echo parameters with said second frequency-domain transmit sub-block transformed according to said first selected transform operation; and, store in said intermediate storage means said output of said third operator means as a set of intermediate frequency-domain echo parameters; and, generate subsequent second echo sub-components in respect of at least one subsequent pair of multi-carrier data blocks selected from subsequent multi-carrier transmit signals, using said set of intermediate frequency-domain echo parameters as input to said fourth operator means without employing said first, said second or said third operator means.

20. An echo canceller according to claim 15, wherein each first transform parameter block and each said second transform parameter block represents an N-point transform where N is an integer substantially equal to said first selected number.

21. An echo canceller according to claim 19 in which:
said first transform parameter block of said first operator means represents an N-point transform; said second transform parameter block of said third operator means represents an N-point transform; said first transform parameter block of said fifth operator means represents an N-point transform; and, said second transform parameter block of said seventh operator means represents an N-point transform where N is an integer substantially equal to said first selected number.

22. An echo canceller according to claim 15 wherein said first transform parameter block represents an Inverse Fourier Transform and said second transform parameter block represents a Fourier Transform.

23. An echo canceller according to claim 6, wherein said echo component generator includes:

a first transforming means for transforming said first frequency-domain transmit sub-block according to a first selected transform operation, and for pre-multiplying said frequency-domain echo parameters with said first frequency-domain transmit sub-block so transformed thereby to produce a first echo sub-component; and, a second transforming means for transforming said first frequency-domain transmit sub-block according to a second selected transform operation, and for pre-multiplying said frequency-domain echo parameters with said second frequency-domain transmit sub-block so transformed thereby to produce a second echo sub-component; and, a third transforming means for transforming said second frequency-domain transmit sub-block according to a third selected transform operation, and for pre-multiplying said frequency-domain echo parameters with said third frequency-domain transmit sub-block so transformed thereby to produce a third echo sub-component; and, a fourth transforming means for transforming said second frequency-domain transmit sub-block according to a fourth selected transform operation, and for pre-multiplying said frequency-domain echo parameters with said fourth frequency-domain transmit sub-block so transformed thereby to produce a fourth echo sub-component, the echo signal being the sum of said first, said second, said third and said fourth echo sub-components.

24. An echo canceller according to claim 23 wherein said updating means is arranged to generate a first sum being the sum of:

said first frequency-domain transmit sub-block transformed according to said first selected transform operation and, said first frequency-domain transmit sub-block transformed according to said second selected transform operation and, said second frequency-domain transmit sub-block transformed according to said third selected transform operation and, said second frequency-domain transmit sub-block transformed according to said fourth selected transform operation; and is further arranged to, generate a second sum being the complex conjugate of said first sum; and to pre-multiply said frequency-domain echo-cancelled receive block with said second sum and with a scalar weight term determined according to said selected condition.

25. An echo canceller according to claim 23, wherein said each of said first, said second, said third and said fourth transforming means comprises:

a first operator means arranged to generate a first transform parameter block arranged to transform into the time domain frequency domain data blocks pre-multiplied thereby;

a second operator means responsive to an output from said second operator means and arranged to arranged to pre-multiply said output of said second operator means with a second transform parameter block arranged to transform into the frequency domain time domain data blocks pre-multiplied thereby;

a third operator means responsive to an output from said third operator means and arranged to pre-multiply said output of said second operator means with one of said first and said second frequency-domain transmit sub-block;

a fourth operator means responsive to an output from said third operator means and arranged to pre-multiply said output of said third operator means with a third transform parameter block arranged to transform into the time domain frequency domain data blocks pre-multiplied thereby.

26. An echo canceller according to claim 25 wherein in said first selected transform operation:
said first transform parameter block represents an Inverse Fourier Transform;
said second transform parameter block represents a Discrete Sine Transform;
said third operator means is arranged to pre-multiply said output of said second operator means with said second frequency-domain transmit sub-block; and,
said third transform parameter block represents a Discrete Cosine Transform.

27. An echo canceller according to claim 25, wherein in said second selected transform operation:
said first transform parameter block represents an Inverse Fourier Transform;
said second transform parameter block represents a Discrete Cosine Transform;
said third operator means is arranged to pre-multiply said output of said second operator means with said first frequency-domain transmit sub-block; and,
said third transform parameter block represents a Discrete Cosine Transform.

28. An echo canceller according to claim 25, wherein, in said third selected transform operation:
said first transform parameter block represents an Inverse Fourier Transform;
said second transform parameter block represents a Discrete Sine Transform;
said third operator means is arranged to pre-multiply said output of said second operator means with said first frequency-domain transmit sub-block; and,
said third transform parameter block represents a Discrete Sine Transform.

29. An echo canceller according to claim 25, wherein, in said fourth selected transform operation:
said first transform parameter block represents an Inverse Fourier Transform;
said second transform parameter block represents a Discrete Cosine Transform;
said third operator means is arranged to pre-multiply said output of said second operator means with said second frequency-domain transmit sub-block; and,
said third transform parameter block represents a Discrete Sine Transform.

30. An echo canceller according to claim 25, wherein, said echo component generator and said updating means both employ the same said first transform parameter block and said second transform parameter block.

31. An echo canceller according to claim 23, wherein, each first transform parameter block and each said second transform parameter block represents an N-point transform where N is an integer substantially equal to said first selected number.

32. An echo canceller according to claim 1, wherein said multi-carrier transmit signals and said multi-carrier receive signals are Discrete Multi-tone (DMT) signals.

33. A multi-carrier transceiver comprising the echo canceller according to claim 1.

34. A multi-carrier transceiver according to claim 33, wherein the transceiver is an Asymmetric Digital Subscriber Line (ADSL) transceiver.

35. A modem comprising the multi-carrier transceiver of claim 33.

36. A multi-carrier transceiver system having: a multi-carrier signal transmitter responsive to input data and arranged to generate therefrom a multi-carrier transmit signal comprising a plurality of multi-carrier data blocks for communication to a remote signal receiver via a signal transmission link;
a multi-carrier signal receiver responsive to an input multi-carrier receive signal received from a remote signal transmitter via said signal transmission link, and responsive to an echo signal and arranged to generate an echo-cancelled receive signal from said input receive signal and said echo signal; and an echo canceller in accordance with claim 1.

37. An echo canceller according to claim 1, wherein the time-domain multi-carrier data blocks are fixed-length multi-carrier data blocks.

38. A method of echo cancelling a multi-carrier signal comprising a plurality of time-domain multi-carrier data blocks, the method comprising:
generating from two consecutive time-domain fixed-length multi-carrier data blocks a set of frequency-domain echo parameters, wherein each of the multi-carrier data blocks identifies a communication symbol and wherein the echo parameters are generated from a diagnolizable matrix that is calculated using a Toeplitz matrix based upon the two consecutive data blocks,
generating an echo signal using the frequency-domain echo parameters, and generating an echo-cancelled received signal from the received multi-carrier signal and the echo signal.

39. An echo canceller for generating an echo-cancelled received signal from a received multi-carrier signal, the echo canceller comprising:
a transmit block generator adapted to generate at least one frequency-domain transmit block from two consecutive time-domain fixed length multi-carrier data blocks in a multi-carrier transmit signal, wherein each of the multi-carrier data blocks identifies a communication symbol;
an echo parameter generator adapted to generate a set of frequency-domain echo parameters based at least partially on the at least one frequency-domain transmit block, and wherein the echo parameters are generated from a diagnolizable matrix that is calculated using a Toeplitz matrix based upon the two consecutive data blocks;
an echo component generator adapted to generate an echo signal using the frequency-domain echo parameters, wherein the echo canceller is adapted to generate the echo-cancelled received signal from the received multi-carrier signal using the echo signal.

40. The echo canceller according to claim 39 wherein the two consecutive fixed length time-domain multi-carrier data blocks each includes a first selected number of time-domain data samples, and wherein the transmit block generator is adapted to:
generate the at least one frequency-domain transmit block from a second selected number of time-domain data samples selected from both of the two consecutive time-domain fixed length multi-carrier data blocks, the at least one frequency-domain transmit block comprising a third selected number of frequency-domain data samples.

41. The echo canceller according to claim 40, wherein the echo canceller further comprises:
a subtractor unit adapted to subtract the echo signal from the received multi-carrier signal in the time domain or in the frequency domain to generate the echo-cancelled received signal;
receive block generator adapted to generate from the echo-cancelled received signal a frequency-domain echo-cancelled receive block comprising a fourth selected number of frequency-domain data samples; and
updating unit adapted to generate a set of frequency-domain echo update parameters based on at least one input frequency-domain transmit block and at least one input frequency-domain echo-cancelled receive block, wherein the echo parameter generator is further adapted to apply the frequency-domain echo update parameters to the frequency-domain echo parameters when a selected condition is met by the frequency-domain echo update parameters.

42. The echo canceller according to claim 41, wherein the at least one frequency-domain transmit block comprises data samples corresponding to eigenvalues of a circulant matrix formed from the second selected number of time-domain data samples selected from the two consecutive multi-carrier fixed length data blocks.

43. The echo canceller according to claim 42, wherein the transmit block generator is further adapted to:
generate, from the at least one frequency-domain transmit block, a first frequency-domain transmit sub-block and a second frequency-domain transmit sub-block such that the first and second frequency-domain transmit sub-blocks do not share a common frequency-domain data sample.

44. The echo canceller according to claim 43, wherein the echo component generator comprises:

a first multiplier unit adapted to multiply the frequency-domain echo parameters with the first frequency domain transmit sub-block to produce a first echo sub-component; and
a transform unit adapted to:
transform the second frequency-domain transmit sub-block according to a first selected transform operation to obtain a transformed frequency-domain transmit sub-block; and
generate a second echo sub-component at least partially by multiplying the frequency-domain echo parameters with the transformed frequency-domain sub-block, wherein the echo signal is a sum of the first and second echo sub-components.

45. The echo canceller according to claim 44 wherein the updating unit is further adapted to:
generate a first sum of the first frequency-domain transmit sub-block and the transformed second frequency-domain transmit sub-block;
generate a second sum as a complex conjugate of the first sum; and
generate the frequency-domain update parameters at least in part by multiplying the frequency-domain echo-cancelled receive block with the second sum and with a scalar weight term determined in accordance with the selected condition.

46. The echo canceller according to claim 43, wherein the transmit block generator is further adapted to:
generate the first frequency-domain transmit sub-block from data samples corresponding to eigenvalues of a circulant matrix formed from the second selected number of time-domain data samples selected from the two consecutive multi-carrier fixed-length data blocks; and
generate the second frequency-domain transmit sub-block from data samples corresponding to eigenvalues of a skew-circulant matrix formed from the second selected number of time-domain data samples selected from the two consecutive multi-carrier fixed-length data blocks.

47. The echo canceller according to claim 46, further comprising an operator adapted to render circulant the skew-circulant matrix.

* * * * *

UNITED STATES PATENT AND TRADEMARK OFFICE
CERTIFICATE OF CORRECTION

PATENT NO. : 8,045,703 B2
APPLICATION NO. : 10/514689
DATED : October 25, 2011
INVENTOR(S) : Fabio Pisoni et al.

It is certified that error appears in the above-identified patent and that said Letters Patent is hereby corrected as shown below:

Col. 25, line 26, equation 25 should read: $\mu \bullet \{diag(\Lambda_{even})\} \bullet W$ Col. 27, line 26, equation 44 should read:
$$R = \begin{bmatrix} 0 & 1 & \cdots & 0 & 0 \\ \vdots & & \ddots & & \vdots \\ 0 & 0 & \cdots & 1 & 0 \end{bmatrix} = [0 \mid I_{N-1} \mid 0]$$

Col. 28, line 15, equation 55 should read: $D = diag(\tilde{C}^I_{N+1} \cdot [a_0 \cdots a_{N-2} \ 0 \ 0])$ Col. 28, line 18, equation 56 should read: $\tilde{D} = diag(0 \ \tilde{S}^I_{N-1} \cdot [b_1 \cdots b_{N-1}] \ 0)$ Signed and Sealed this
Twenty-ninth Day of November, 2011

David J. Kappos
*Director of the United States Patent and Trademark Office*